United States Patent
Kawahara

(10) Patent No.: US 6,982,746 B1
(45) Date of Patent: Jan. 3, 2006

(54) APPARATUS AND METHOD FOR CORRECTING SHAKE BY CONTROLLING SAMPLING TIMING OF SHAKE SIGNAL

(75) Inventor: Hideo Kawahara, Hatogaya (JP)

(73) Assignee: Canon Kabushiki Kaisha (JP)

( * ) Notice: Subject to any disclaimer, the term of this patent is extended or adjusted under 35 U.S.C. 154(b) by 0 days.

(21) Appl. No.: 09/255,144

(22) Filed: Feb. 22, 1999

(30) Foreign Application Priority Data

| Feb. 24, 1998 | (JP) | 10-042045 |
|---|---|---|
| Mar. 13, 1998 | (JP) | 10-062900 |
| Mar. 20, 1998 | (JP) | 10-092667 |
| Apr. 10, 1998 | (JP) | 10-114352 |

(51) Int. Cl.
*H04N 5/228* (2006.01)

(52) U.S. Cl. ............... 348/208.99; 348/208.1; 348/208.2; 348/208.3; 348/208.4; 348/208.5; 348/208.6

(58) Field of Classification Search ........... 348/208.99, 348/208.1, 208.2, 208.3, 208.4, 208.5, 208.6
See application file for complete search history.

(56) References Cited

U.S. PATENT DOCUMENTS

| 4,992,855 | A | * | 2/1991 | Takei | 348/226.1 |
|---|---|---|---|---|---|
| 5,210,563 | A | * | 5/1993 | Hamada et al. | 396/53 |
| 5,237,365 | A | * | 8/1993 | Miyazawa | 396/49 |
| 5,502,484 | A | * | 3/1996 | Okada | 348/208.6 |
| 5,585,875 | A | * | 12/1996 | Imafuji et al. | 396/55 |
| 5,587,737 | A | * | 12/1996 | Sekine et al. | 348/208.8 |
| 5,905,848 | A | * | 5/1999 | Yano et al. | 386/117 |
| 5,978,599 | A | * | 11/1999 | Wakabayashi et al. | 396/52 |
| 5,990,942 | A | * | 11/1999 | Ogino | 348/208.6 |
| 6,173,121 | B1 | * | 1/2001 | Tomita et al. | 396/52 |
| 6,501,503 | B2 | * | 12/2002 | Kudo | 348/208.99 |
| 2001/0012059 | A1 | * | 8/2001 | Kudo | 348/208 |
| 2003/0035053 | A1 | * | 2/2003 | Kyuma et al. | 348/208.2 |

FOREIGN PATENT DOCUMENTS

| JP | 04-352575 | 7/1992 |
|---|---|---|
| JP | 05-316404 | 11/1993 |
| JP | 07-023275 | 1/1995 |
| JP | 09-051469 | 2/1997 |
| JP | 11-098420 | 4/1999 |
| JP | 11-205657 | 7/1999 |

OTHER PUBLICATIONS

English Abstract for JPA 11–098420 (Item A).
Japanese Office Action dated Dec. 7, 2004 for Japanese Patent Application No. 10–042045.

* cited by examiner

*Primary Examiner*—Wendy R. Garber
*Assistant Examiner*—James M. Hannett
(74) *Attorney, Agent, or Firm*—Morgan & Finnegan, LLP

(57) ABSTRACT

There is disclosed a shake prevention apparatus for compensating for a disturbance in an image resulting from a camera shake. A shake of a camera main body is measured by a gyro sensor. Upon sampling the output signal from the sensor by an A/D converter, a sampling timing corresponding to a shutter speed is set. Especially, a timing is generated so that the sampling timing corresponds to the central position of the charge storage period of a CCD.

4 Claims, 28 Drawing Sheets

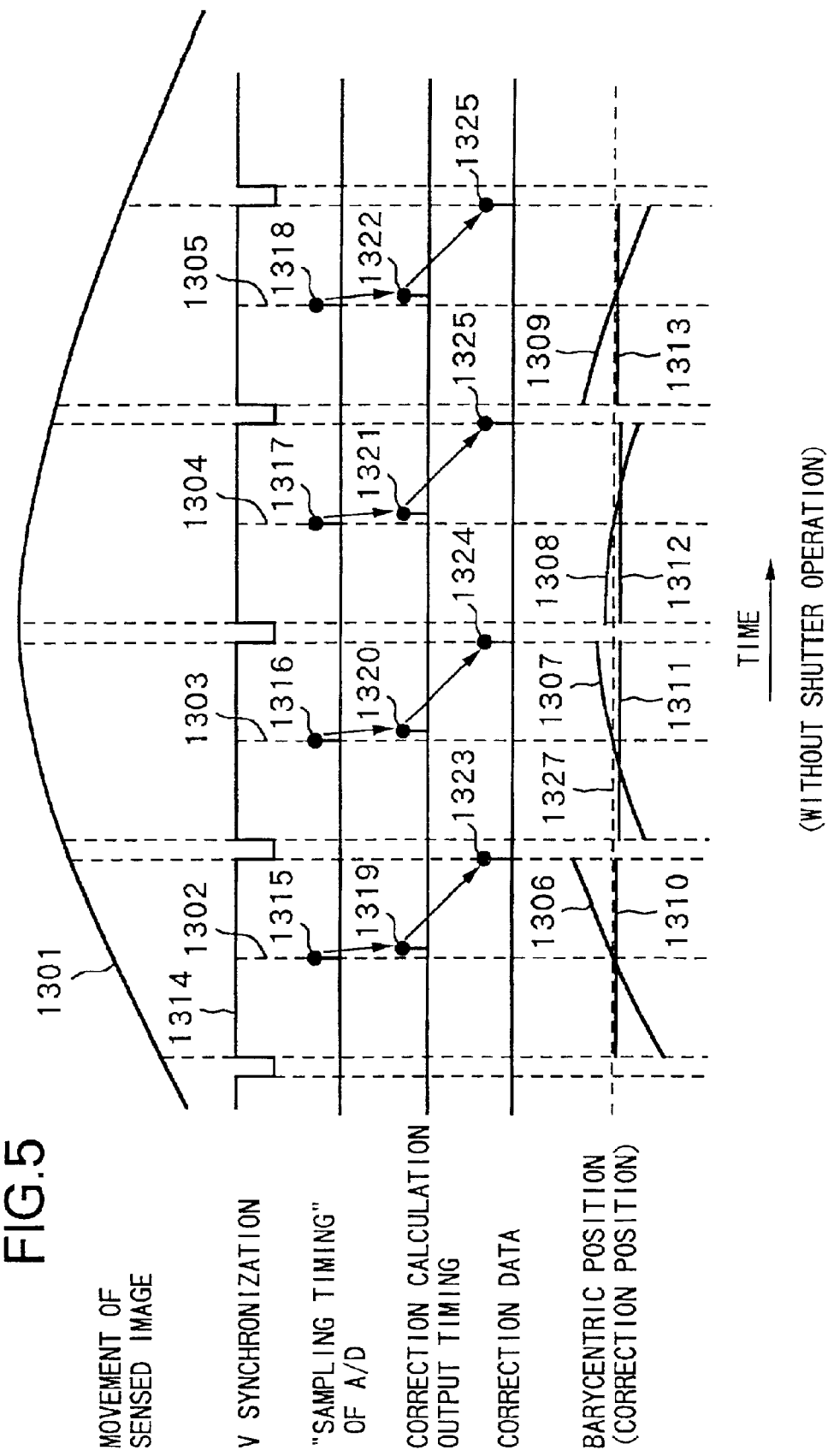

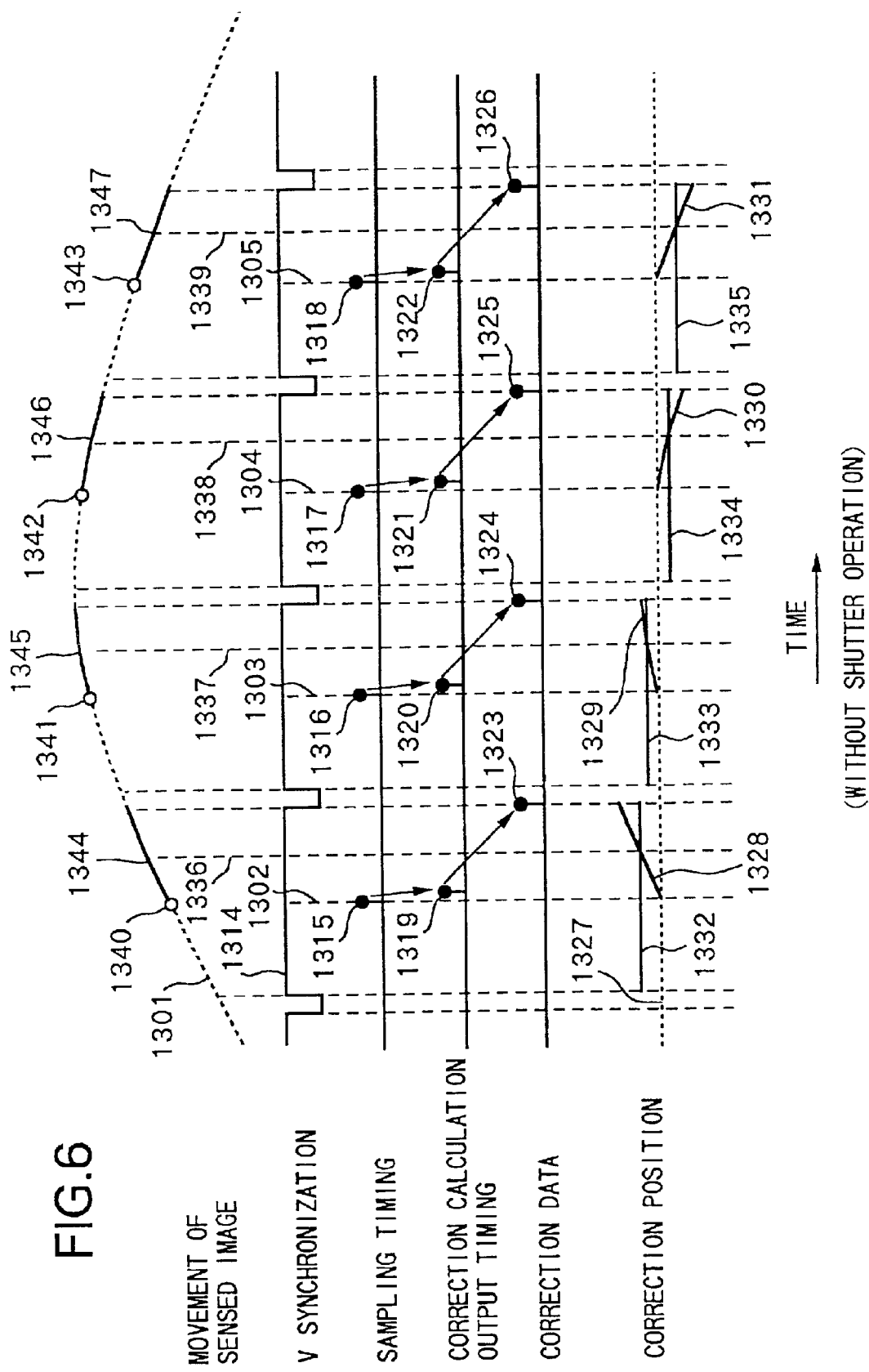

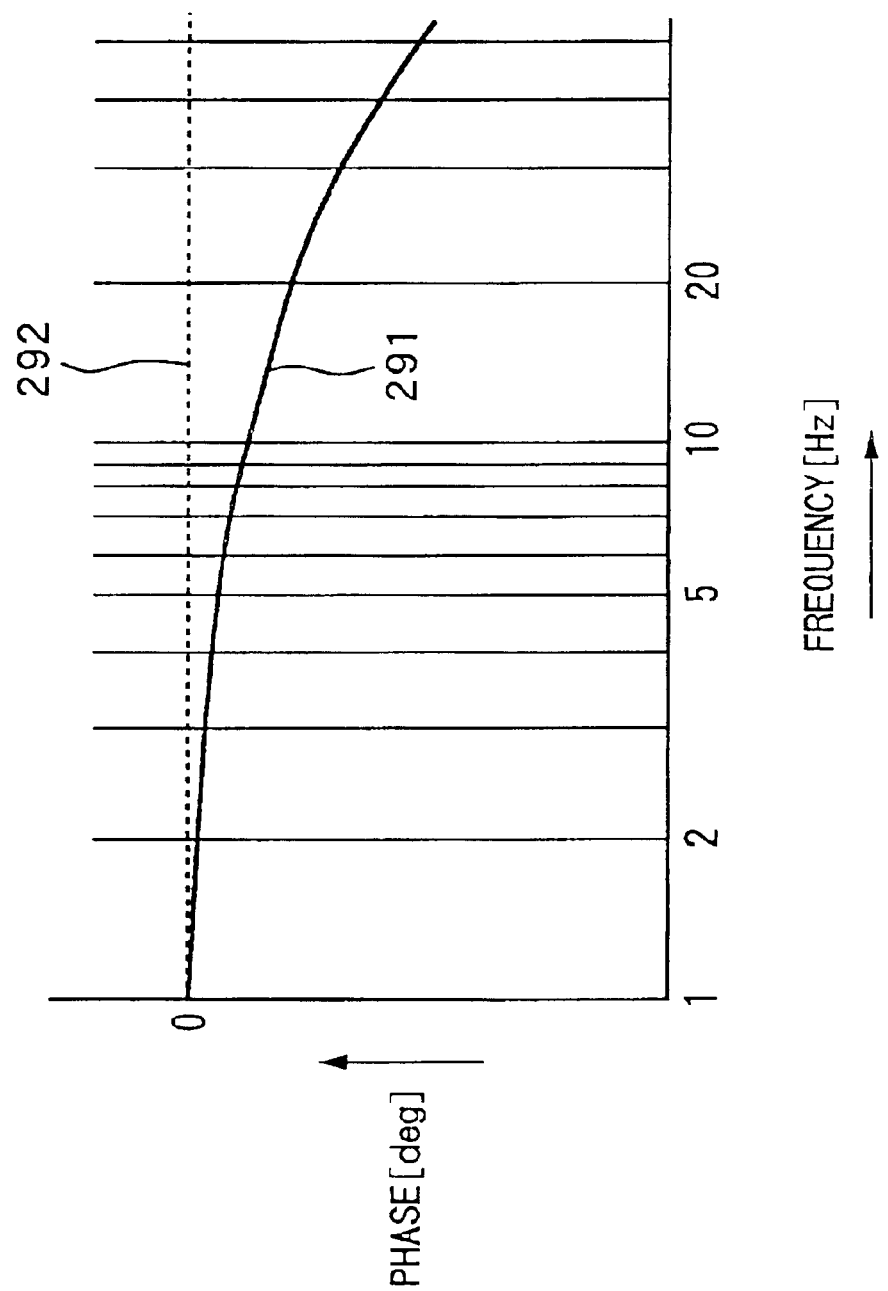

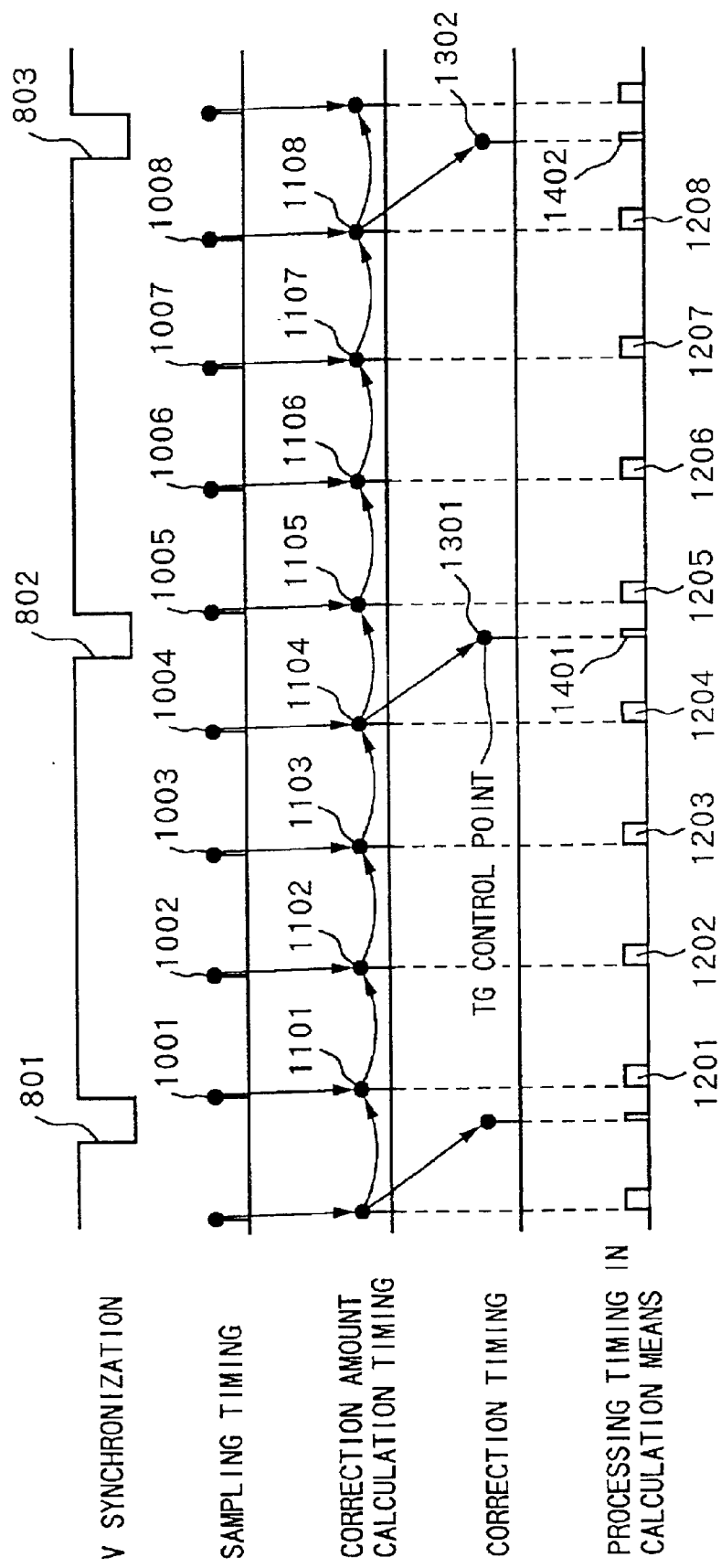

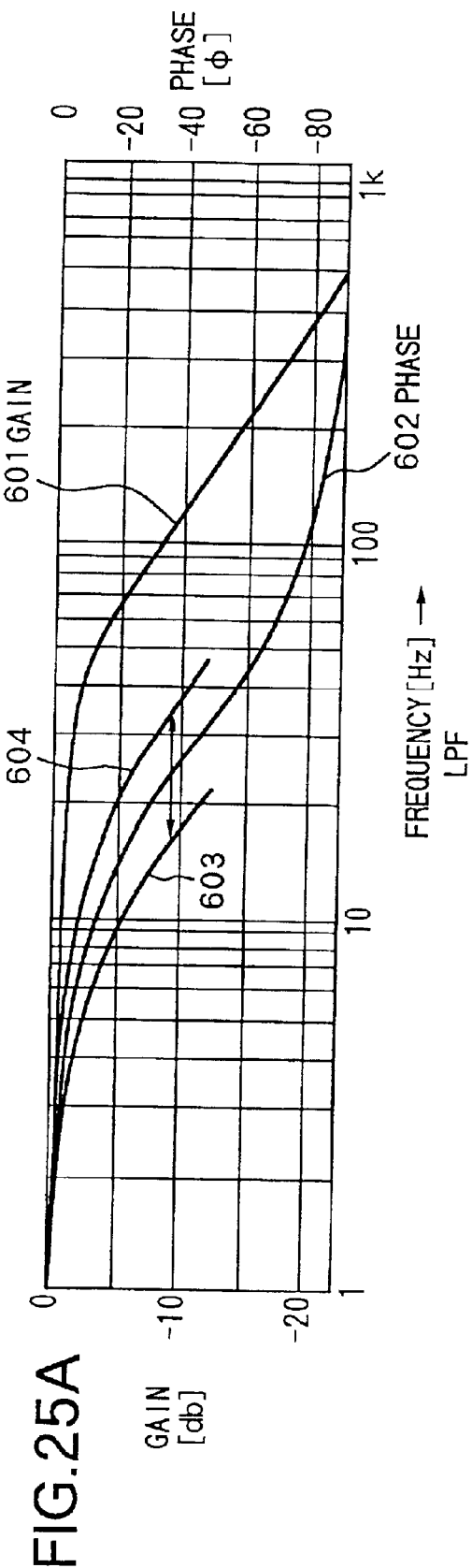
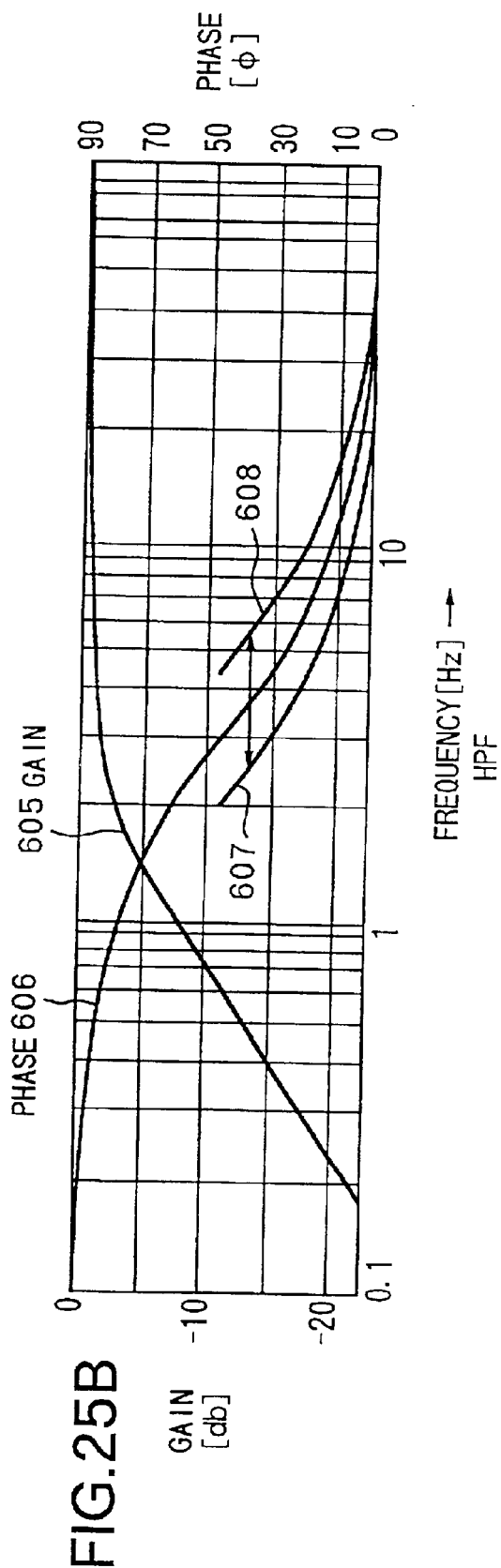
FIG.25A
FIG.25B

FIG.26

SAMPLING POINT-PHASE COMPENSATION AMOUNT TABLE

| FREQUENCY [Hz] / AE[s] | 0.7 | 1 | 2 | 3 | 5 | 7 | 10 | 20 |
|---|---|---|---|---|---|---|---|---|
| 1/60 | 5/-3.0 | 5/-2.7 | 5/-2.5 | 5/-2.2 | 5/-2.0 | 5/-1.8 | 5/-1.5 | 5/-1.2 |
| 1/100 | 6/-3.6 | 6/-3.3 | 6/-3.0 | 6/-2.7 | 6/-2.4 | 6/-2.2 | 6/-1.9 | 6/-1.7 |
| 1/120 | 7/+1.4 | 7/+1.3 | 7/+1.2 | 7/+1.1 | 7/+1.0 | 7/+0.9 | 7/+0.8 | 7/+0.6 |
| 1/250 | 8/+4.0 | 8/+3.5 | 8/+3.1 | 8/+2.8 | 8/+2.5 | 8/+2.2 | 8/-1.9 | 8/-1.5 |
| 1/500 | 9/-1.2 | 9/-1.1 | 9/-1.0 | 9/-0.9 | 9/-0.8 | 9/-0.7 | 9/-0.5 | 9/-0.4 |
| 1/1000 | 9/-2.5 | 9/-2.2 | 9/-2.0 | 9/-1.8 | 9/-1.5 | 9/-1.3 | 9/-1.1 | 9/-1.0 |

APPARATUS AND METHOD FOR CORRECTING SHAKE BY CONTROLLING SAMPLING TIMING OF SHAKE SIGNAL

BACKGROUND OF THE INVENTION

The present invention relates to an image sensing apparatus comprising an electronic anti-shake system that corrects a shake by electrically extracting a sensed image on the basis of shake information of a camera and an image sensing method, and to a shake correction apparatus and method.

Conventionally, image sensing apparatuses such as video cameras and the like have a variety of automatic functions such as AE (auto exposure), AF (auto focus), and the like, and can sense and output a good image.

Also, to compensate for a drop of sensed image quality resulting from a shake of an image sensing apparatus along with recent size reduction of video cameras and higher magnification of optical systems, various shake correction image sensing apparatuses that correct such camera shake have been proposed.

FIG. 1 shows an example of the arrangement of a conventional image sensing apparatus with a shake correction function.

Referring to FIG. 1, this image sensing apparatus is composed of an image sensing unit and a camera shake correction unit. The image sensing unit (camera unit) has a lens 901, image sensing device 902, and signal processing circuit 903. The image sensing device 902 comprises a CCD or the like as a photoelectric conversion means, and converts an optical signal into an electrical signal. The signal processing circuit 903 converts the electrical signal output from the image sensing device 902 into a standard video signal such as an NTSC signal or the like, and has a video output terminal 904 from which the standard video output is obtained.

Also, in FIG. 1, the camera shake correction unit comprises an angular velocity sensor 905 serving as a shake detection means, a DC cut filter 906, an amplifier 907, a computer 908 (to be abbreviated as COM hereinafter) serving as a correction amount calculation means, an electronic shutter 909 serving as an AE control means, a read controller 910, and a timing generator 911.

The angular velocity sensor 905 comprises, e.g., a vibration gyro attached to the image sensing apparatus main body, and detects any shake of the image sensing apparatus main body in two coordinate axes which are fixed with respect to the apparatus main body. That is, the output signal from the sensor 905 contains horizontal and vertical angular velocity signals. In the following description, the output signals from the sensor 905 in the two directions will be simply referred to as an angular velocity signal, and signal processing in the apparatus shown in FIG. 1 is done based on this angular velocity signal, for the sake of simplicity.

The DC cut filter 906 cuts off DC components of the angular velocity signal output from the angular velocity sensor 905, and passes only AC components, i.e., shake components. Note that the DC cut filter 906 may use a high-pass filter (to be abbreviated as an HPF hereinafter) that cuts off signal components in a predetermined frequency band. The amplifier 907 appropriately amplifies the angular velocity signal output from the DC cut filter 906.

The COM 908 has a microcomputer, and includes an A/D converter 908a, high-pass filter (HPF) 908b, integral circuit 908c, D/A converter 908d, and pan/tilt determination circuit 908e.

The A/D converter 908a converts the angular velocity signal output from the amplifier 907 into a digital signal. The HPF 908b cuts off low-frequency components of the digital output of the A/D converter 908a, and has a function capable of varying its characteristics in an arbitrary frequency band. The integral circuit 908c integrates the output (angular velocity signal) from the HPF 908b to output an angular displacement signal, and has a function capable of varying its characteristics in an arbitrary frequency band. The DA converter 908d converts the integral signal output from the integral circuit 908c, i.e., the angular displacement signal, into an analog signal. The pan/tilt determination circuit 908e determines panning/tilting on the basis of a digital angular velocity signal 908f and an integral signal 908g (i.e., angular displacement signal) obtained by integrating the angular velocity signal, from which the low-frequency components have been cut, by the integral circuit 908c. The pan/tilt determination circuit 908e performs panning control (to be described later) on the basis of the levels of the input angular velocity signal 908f and angular displacement signal 908g. Also, the obtained angular displacement signal 908g is used as a target value for shake correction in control done at a later time.

The electronic shutter 909 especially controls the charge storage time period in the image sensing device 902 in this embodiment. Although not shown, the electronic shutter 909 operates in accordance with the exposure state of the image sensing device 902 or user's operation.

The shake correction control in FIG. 1 controls the read start position of the image sensing device 902 on the basis of the displacement amount signal 908g that represents shake amount. For this purpose, the read controller 910 moves the read start position of the image sensing device 902 in correspondence with the angular displacement signal 908g. The read controller 910 also controls the storage time period of the image sensing device 902 by the electronic shutter 909 at the same time.

The timing generator 911 generates drive pulses for signal storage or read of the image sensing device 902 on the basis of control information supplied from the read controller 910, and sends them to the image sensing device 902.

The operation of the pan/tilt determination circuit 903e in the COM 908 will be described in detail below.

The determination circuit 908e receives the angular velocity signal 908f and angular displacement signal 908g, and determines that panning or tilting is underway in place of a shake, when it is determined that the angular velocity signal 908f is equal to or higher than a predetermined threshold value or when the angular velocity signal 908f is equal to or smaller than the predetermined threshold value but the angular displacement signal 908g is equal to or higher than a predetermined threshold value. If it is determined that panning or tilting is underway, the determination circuit 908e shifts the cutoff frequency range of the HPF 908b to the higher-frequency side to change the characteristics so that the shake correction system does not respond to lower frequencies. Furthermore, the determination circuit 908e executes so-called "panning control". In this panning control, the time constant of the integral characteristics of the integral circuit 908c is shifted in a direction to become shorter so as to move the central position of the image extraction position (1203 or 1204 in FIG. 5; to be described later) by the read controller 910 to the center of the entire area of the image sensing device 902, thereby bringing a value stored in the integral circuit 908c close to a reference value (a value that can be assured while no shake is detected). During this panning control, the angular velocity signal 908*f* and angular displacement signal 908*g* are detected. When the panning/tiling determination result changes to NO, i.e., when the user has finished panning or tilting, after the determination circuit 908*e* lowers the cutoff frequency to restore the original value and to broaden the shake correction range, it leaves the panning control.

Pan determination will be explained below with reference to the flow chart in FIG. 2. Note that the processing shown in this flow chart repeats itself at predetermined timings.

In step S1001, the angular velocity signal amplified by the amplifier 907 is converted from an analog amount into a digital value that can be processed inside the COM 908. In step S1002, the HPF 908*b* executes HPF processing using a cutoff frequency $f_c$ prepared in the previous processing. In step S1003, the integral circuit 908*c* integrates using a time constant τ prepared in the previous processing. In step S1004, the D/A converter 908*d* converts the integral result (i.e., the angular displacement signal 908*g*) in step S1003 into an analog amount, and outputs it.

It is then checked in step S1005 if the angular velocity signal 908*f* is equal to or higher than a predetermined threshold value $TH_1$. If the angular velocity signal is equal to or higher than the predetermined threshold value $TH_1$, the value of the cutoff frequency $f_c$ to be used in the next HPF calculation is set to be higher by a predetermined value $\Delta_1$ than the current value in step S1006. The shift operation of the cutoff frequency to the higher-frequency side sets the total attenuation factor of a signal in a low-frequency range to be higher than the current one. In step S1007, the time constant τ used in the integral calculation is set to be shorter by a predetermined value than the current value, so that the angular displacement output 908*g* comes close to the reference value.

On the other hand, if it is determined in step S1005 that the angular velocity signal 908*f* is not equal to or higher than the predetermined threshold value $TH_1$, it is checked in step S1008 if the integral value 908*g* is equal to or higher than a predetermined threshold value $TH_2$. If the integral value 908*g* is equal to or higher than the predetermined threshold value $TH_2$, the flow advances to step S1006; otherwise, the flow advances to step S1009. In step S1009, the value of the cutoff frequency $f_c$ to be used in the next HPF calculation is set to be lower by the predetermined value $\Delta_1$ than the current value, so as to set the signal attenuation factor in the low-frequency range to be lower than the current one. In step S1010, the time constant τ to be used in the integral calculation is set to be longer by a predetermined value than the current value to improve the integral effect, and this processing ends.

With the above-mentioned control, when the shake velocity (angular velocity) value is large or when the integral value may be saturated, a higher cutoff frequency $f_c$ is set (step S1006) or a shorter integral time constant τ is set (step S1007), thus preventing the output from the integral circuit 908*c* from being saturated. As described above, since this integral value is D/A-converted, and is used in shake correction (to be described later) by the read controller 910, preventing the integral circuit 908 from being saturated leads to preventing the correction target value for shake correction from being saturated, realizing stable anti-shake control.

The shake correction in this prior art will be briefly described below with reference to FIG. 3. This shake correction is implemented by changing the read position of image data form the image sensing device 902, that is, changing the image extraction position, in accordance with the output from the integral circuit 908*c*.

Referring to FIG. 3, reference numeral 1100 denotes an entire image sensing area of the image sensing device 902. Reference numeral 1101 denotes an extracted image area, which is extracted from the entire image sensing area 1100, and is actually converted into a standard video signal to be output as a video signal. Reference numeral 1106 denotes an object which is sensed by the photographer. In the following description, the outer sides of the extracted image area will be called an extraction frame.

When the extracted image area 1101 is converted into a standard video signal and the converted signal is displayed, a video denoted by 1105 is obtained. That is, in FIG. 3, reference numeral 1105 denotes a video area of a monitor that reproduces a video signal; and 1106', an object (principal object) reproduced on the video area 1105 of the monitor. By outputting a portion obtained by excluding the peripheral portion from the entire image sensing area 1100 of the image sensing device 902 by sensed image extraction (to be described later), the video area 1105 on the monitor can be reproduced.

Furthermore, in FIG. 3, reference numeral 2000 denotes a change in image when the photographer who senses the object 1106 has inadvertently swayed the image sensing apparatus in the lower left direction indicated by arrows 1102, 1102', and 1102". When a shake in the lower left direction has taken place, the object 1106 moves in the upper right direction indicated by an arrow 1104 on the entire image sensing area 1100. In this state, if extraction is done using a frame area 1101' located at the same position as that of the above-mentioned extraction frame 1101, a video signal that represents an image in which the object 1106 has moved by a vector amount indicated by an arrow 1104 is generated.

When the extraction frame is moved from the position 1101' to a position 1101" using a displacement amount 1103 (i.e., a shake correction target value) obtained based on the shake amount of the image sensing apparatus, and the image is extracted using this displaced extraction frame 1101", the same video as the video 1105 can be obtained. Using this principle, shake correction of an image is implemented.

Displacement control of the extraction position of the image sensing area will be explained below with reference to FIG. 4.

Referring to FIG. 4, reference numeral 1200 denotes the entire pixel set of the image sensing device 902. Reference numeral 1201 denotes a unit pixel which corresponds to one photoelectric conversion element. Based on electrical drive pulses generated by the timing generator 911, storage and read are controlled in units of pixels.

Reference numerals 1202 and 1203 denote extraction frames which are the same as the extraction frame 1101 shown in FIG. 3, i.e., those when no shake is produced. A case will be exemplified below wherein a video signal is extracted using the extraction frame 1202 shown in FIG. 4.

Initially, photoelectrically converted charge amounts are read out in turn from pixel "S" in a direction indicated by an arrow 1205 (i.e., horizontal direction). This read is started in synchronism with the synchronization period of the output video signal. Since pixel data corresponding to the synchronization period is not displayed, that pixel is read out at a rate higher than the data read rate of a pixel to be displayed, i.e., the normal read rate. The first synchronization period continues to a position one pixel before pixel "A" in FIG. 4.

During an actual video period after the end of the first synchronization period, charges in pixels A to F are read out as image information for one line of a video signal according to the normal read rate.

Furthermore, during the horizontal synchronization period up to the next line, all pixels from a pixel next to pixel F to a pixel before pixel G are read out at a transfer rate higher than the normal read rate to prepare for a read of the next actual video period. A read from pixel G is then started as in that from pixels A to F.

By controlling the read timings, as described above, all pixel data bounded by the extraction frame 1202 can be selectively extracted from the entire image sensing area 1100 of the image sensing device 902 and can be converted into a video signal.

Shift of the extraction position when a sensed image has moved upon movement of the image sensing apparatus resulting from a shake will be explained below. When it is detected that the object has moved (=the image sensing apparatus has been shaken) by an amount indicated by an arrow 1204, the extraction frame is changed from the position 1202 to a position 1203. By extracting an image using the changed extraction frame, a video free from any movement errors of the object can be obtained.

In order to change the extraction position, when the read start position is shifted from pixel "A" to pixel "B", an objective partial image can be selectively extracted from the image sensing area 1100 and can be converted into a video signal as in the read starting from pixel "A".

In practice, photoelectrically converted charge amounts are read out in turn from pixel "S" in the direction indicated by the arrow 1205 as in the read of the contents of the extraction frame 1202. This read is started within the synchronization period of the output video signal, and all pixels up to a pixel one pixel before pixel "B" are read out at a transfer rate higher than the normal read rate. During the actual video period, a read can start from pixel "B".

To restate, the displacement vector 1204 is generated by the read controller 910 on the basis of the displacement amount signal 908g. More specifically, the synchronization period shown in FIG. 4 is determined by the read controller 910 on the basis of the displacement amount signal 908g. In this fashion, in image extraction the peripheral image sensing area of the image sensing device 902 is partially read during the synchronization signal period that falls outside the actual video period by an amount corresponding to shake correction information, and only pixel data extracted in the actual video period are selectively read out, thus obtaining a video signal free from an image blur arising from the shake of the image sensing apparatus.

As can be seen from FIG. 1, the correction amount (integral value 908g) is calculated based on the output from the angular velocity sensor 905 independently of storage/read of image data in the CCD 902. Since shake correction that has been explained in relation to FIG. 3 extracts image data stored in the photoelectric conversion elements of the image sensing device 902 using an appropriate extraction frame, no problem is posed even when the shake of the camera main body is large and the value of the integral output 908g increases, unless the electronic shutter 909 operates. This is because shake correction based on the output from the COM 908 controls the image extraction position and does not influence the charge storage time period.

The reason why shake correction appropriately effects unless the electronic shutter 909 operates for exposure amount control will be explained below with reference to FIG. 9.

FIG. 5 is a timing chart showing movement of an image stored in the image sensing device 902 and the extraction timings along with an elapse of time.

Referring to FIG. 5, reference numeral 1301 denotes a moving amount of an image on the surface of the image sensing device 902 upon occurrence of shake of the image sensing apparatus, in other words, shake of the image sensing apparatus itself. In the example shown in FIG. 5, the image sensing apparatus has swayed to first increase the image moving amount and then to decrease it.

Referring to FIG. 5, reference numeral 1314 denotes a vertical synchronization signal (V synchronization signal) generated in the image sensing apparatus. More specifically, when this V synchronization signal is low level, known vertical synchronization control is done. The duration between two consecutive V synchronization signals corresponds to one field time period. More specifically, during the high-level period of the V synchronization signal, image data photoelectrically converted during this field (odd field) in the CCD 902 are stored parallel to a read of image data stored one field (even field) before.

Reference numerals 1315, 1316, 1317, and 1318 denote the sampling timings of the A/D converter 908a; and 1319, 1320, 1321, and 1322, the output timings of a shake correction target value (i.e., displacement vector 1204) from the COM 908 serving as the correction amount calculation means to the read controller 910. Reference numerals 1323, 1324, 1325, and 1326 denote timings at which the read controller 910 uses the correction target value output from the COM 908 in the read control of the image sensing device 902. Since the timings 1323, 1324, 1325, and 1326 match the low-level timings of the V synchronization signal, image extraction control is started from the synchronization period for a field (even field) next to the field (e.g., odd field) in which motion has been detected.

Reference numeral 1306 in FIG. 5 denotes a change (a displacement per unit time period) in moving amount of an image during one field. When the electronic shutter 909 is inoperative, the whole period between the two vertical synchronization periods corresponds to the storage time period of the image sensing device 902. Hence, the change 1306 represents the displacement of an image on the surface of the image sensing device 902 during the storage time period in one field. When the image displacement amount 1306 is integrated across the synchronization period (the period between the two V synchronization signals), the integral value indicates the barycentric position of an image during a unit storage period. Assume that the barycentric positions of displacement amounts 1306, 1307, 1308, and 1309 have been detected at positions 1310, 1311, 1312, and 1313. The barycentric positions 1310, 1311, 1312, and 1313 of an image assume a value close to a reference value 1327 indicated by the broken line as long as the maximum value of the slope of the displacement amount 1301 is small to some extent, although they vary depending on the slopes and curvatures of the image displacement amounts 1306, 1307, 1308, and 1309 per unit time period. In other words, while the electronic shutter is inoperative, the differences between the reference value 1327 and the values of the barycentric positions 1310, 1311, 1312, and 1313 as the integral values of the displacement amounts 1306, 1307, 1308, and 1309 become small.

The central time of one period of the V synchronization signal (i.e., central times 1302, 1303, 1304, and 1305 of video periods) is set as the sampling timing of the angular displacement signal (the output from the D/A converter 908d) used in shake correction. This timing is indicated by "sampling timings" 1315, 1316, 1317, and 1318 in FIG. 5. Unless the electronic shutter operates, since the CCD 902 records the displacements 1306, 1307, 1308, and 1309 for one frame period, the central time positions of the displacement amounts 1306, 1307, 1308, and 1309 nearly match the sampling timings 1315, 1316, 1317, and 1318. Since the read control of the image sensing device 902 is done based on such timing, the read controller 910 executes shake correction control to center on the image stored at the sampling timing 1315.

When the electronic shutter is inoperative, a video signal stored during the period of the image displacement amount 1306, 1307, 1308, or 1309 on the surface of the image sensing device 902 for the storage time period in one field is output from the image sensing device 902 while the next field is being stored. If the previously determined correction target value data is used at the time of this read, no time mismatch occurs between the shake which is being stored and the time period required until the correction target value.

Furthermore, in FIG. 5, reference numeral 1327 denotes the reference value (=center at the time of correction, correction center) upon correction, and control is done so that the integral value of an image stored at the sampling timing 1315, 1316, 1317, or 1318 of the shake information matches this reference value 1327.

In this way, since the shake information sampling point is set at the center 1302, 1303, 1304, or 1305 of the synchronization period, the timing the value of the displacement amount 1306, 1307, 1308, or 1309 matches the reference value 1327, i.e., the time of the intersection between the displacement amount curve 1306, 1307, 1308, or 1309 and line 1310, 1311, 1312, or 1313 is set at a point in the neighborhood of the shake center of an image during the storage time period of the image sensing device 902, thus achieving shake correction by extraction.

In the system for correcting (or compensating for) an image blur shown in FIGS. 1 to 5, since the timing of determination and correction of the shake correction amount based on shake correction information is reached once per read period of the image sensing device 902, detection of shake information and calculation of the correction target value used in shake correction are made once per read.

More specifically, as has been explained with reference to FIG. 5, the shake information (angular velocity) is sampled once per synchronization period (one field period) at the central time 1315, 1316, 1317, or 1318, and the correction target value to be output based on the sampling data is formed once per synchronization period for one field, as indicated by 1319 to 1322. Of course, the read timing control of the image sensing device 902 is also determined at the beginning of the vertical synchronization period and remains unchanged until the next timing.

In this conventional image sensing apparatus, detection of the image blur amount and calculation of the target value of a correction control variable are made at nearly the central time (1315 to 1318) of the synchronization period. In such image sensing apparatus, the electronic shutter 909 operates for the purpose of controlling the exposure amount, temporarily resets charges to zero during the storage time period of the image sensing device 902, and restarts storage, thus controlling the storage time period of the image sensing device 902. When the electronic shutter is operated, the barycentric position of an image during the actual storage time period and the reference position upon correction may have a large difference unlike in the case described with reference to FIG. 5.

Why such large difference is produced will be explained below with reference to the timing chart shown in FIG. 6.

FIG. 6 shows the movement of an image stored in the image sensing device 902 and the extraction timings along with an elapse of time, as in FIG. 5.

Referring to FIG. 6, reference numeral 1301 denotes the moving amount of an image on the surface of the image sensing device 902 as in FIG. 5, in other words, the shake of the image sensing apparatus itself.

Also, points 1340, 1341, 1342, and 1343 respectively indicate the refresh timings at which the charges on the image sensing device 902 are reset. In the example shown in FIG. 6, such timing is set at nearly the center in one field, i.e., the refresh operation continues until a timing (timings 1340, 1341, 1342, and 1343) near the central time of one field period. Hence, if charges are reset at that timing, the electronic shutter speed assumes a value half the shutter speed in normal storage (FIG. 5). At this time, time periods indicated by solid curves 1344, 1345, 1346, and 1347 indicate movements of an image effectively stored as a sensed image in the image sensing device 902.

Reference numeral 1314 denotes a vertical synchronization signal generated in the image sensing apparatus as in FIG. 5. Reference numeral 1328 denotes a change in moving amount of the image effectively stored as the sensed image during one field, i.e., the displacement amount per unit time period. Reference numerals 1328, 1329, 1330, and 1331 denote displacements of an image on the surface of the image sensing device 902 during the effective storage time periods for one field. These displacements continue for periods nearly half the image displacement amounts 1306, 1307, 1308, and 1309 described above with reference to FIG. 5, and account for roughly half the entire displacement amounts.

When central times 1302 to 1305 between the synchronization periods of the synchronization signal 1314 are used as the sampling timings of an angular displacement signal used in shake correction as in the description of the prior art, the storage start time of each of the displacement amounts 1328 to 1331 per unit time period is set as a correction point upon image extraction, and shake correction control is done based on the displacement amount at that timing to locate an image stored at the sampling timing at the correction center at its read timing from the image sensing device 902.

Reference numeral 1327 denotes a reference position upon correction, and control is made to locate an image stored at the timing 1302 as a sampling point on this reference position 1327. Extraction control based on displacement amounts 1329 to 1331 per unit time period is similarly made.

A line 1332 indicates the integral value of the displacement amount 1328 per unit time period, i.e., the barycentric position of an image during a unit storage time period as in the above description. As can be seen from the barycentric position 1332 of the image, the difference from the reference position 1327 upon correction becomes larger than that in the prior art described above with reference to FIG. 5. The same applies to barycentric positions 1333 to 1335.

When storage & read control of the image sensing device 902 by the electronic shutter operation is made, the target correction reference position separates from the actual image barycentric position upon shake correction, and a video cannot be obtained with a sufficient anti-shake effect.

Furthermore, as the storage time period becomes shorter in relation to the electronic shutter operation, this difference becomes larger. Hence, the problem that the correction reference position separates from the image barycentric position cannot be ignored.

The first problem in the prior art has been explained.

As the second problem in the prior art, correction errors are produced in shake correction due to errors in the response characteristics of the shake detection means with respect to shake frequency. More specifically, such correction errors are produced when the response characteristics of an angular velocity sensor such as a gyro sensor or the like used as shake detection means with respect to frequency worsens as the frequency becomes higher.

FIG. 7A shows the typical frequency response characteristics of an angular velocity sensor. In FIG. 7A, the abscissa plots the frequency ranging from about 1 Hz to 20 Hz, which is considered as the camera shake frequency range of an image sensing apparatus. The ordinate plots the phase characteristics, which represent a lead or delay of the output from the angular velocity sensor with respect to the actual shake.

When the shake frequency applied is low, the gyro sensor 905 exhibits characteristics indicated by a curve 292 in FIG. 7A, which are free from any phase delay or lead. As the frequency applied to the sensor becomes higher, the response characteristics of the sensor 905 show a phase delay.

A gyro sensor which is popularly used, e.g., a vibration gyro sensor produces a delay around 10 deg at 20 Hz.

Since this delay amount of the sensor output as the shake detection means finally appears as correction errors upon shake correction, if the delay amount of the response characteristics of the shake detection means increases, the correction performance of shake correction (anti-shake rate) deteriorates.

The second problem resulting from a response delay unavoidable in a shake detection sensor such as a gyro sensor or the like has been explained.

The first and second problems occur when the angular sensor signal is sampled once per field period.

A problem (third problem) that occurs in a prior art which samples a sensor signal a plurality of number of times within one field period will be explained below.

In a conventional image sensing apparatus with a camera shake prevention function, an angular velocity sensor such as a gyro or the like is used to detect a shake signal as in the above-mentioned prior art, and the output from this sensor is input via an A/D converter. At this time, in order to improve the precision of data output from the sensor and to prevent noise, a sensor output is sampled a plurality of number of times within one field period, the obtained outputs are A/D-converted into a plurality of digital data, and the digital data are integrated.

Since the hardware arrangement of this conventional multi-sampling image sensing apparatus is substantially the same as that shown in FIG. 1, FIG. 1 will be quoted.

FIG. 7B is a timing chart for explaining the "sampling timings" of an angular velocity sensor 905 used in this conventional multi-sampling image sensing apparatus, the integral value calculation timings of an integral circuit 908c, and the "correction timings" at which shake correction is done based on the obtained integral value.

Referring to FIG. 7B, reference numerals 801 to 803 denote vertical synchronization signals; and 1001 to 1008, sampling timings, i.e., the conversion timings of an angular velocity signal obtained from the angular velocity sensor 905 into a digital amount by an A/D converter 908a. These sampling timings have an appropriate phase relationship with the vertical synchronization signals 801 to 803, and intervals between neighboring timings are equal to each other, as shown in FIG. 7B.

In the conventional multi-sampling image sensing apparatus, angular velocity information sampled at each of the timings 1001 to 1008 by the A/D converter 908a is integrated by the integral circuit 908c at each of timings 1101 to 1108. In the example shown in FIG. 7B, integral results are obtained at timings 1104 and 1108. A read controller 910 receives these integral results (shake correction target values) at timings 1301 and 1302 to execute camera shake correction.

However, in this conventional multi-sampling image sensing apparatus, when shake correction control is continuously done at the above-mentioned control timings, since the shake correction target values are calculated at fixed timings having equal time intervals, the use efficiency of a COM is poor.

More specifically, as shown in FIG. 7B, shake information is sampled at the sampling timings 1001 to 1008, and a correction amount calculation is started at timings 1101 to 1108 in correspondence with the sampling timings. These calculation time periods are indicated by processing timings 1201 to 1208 in the COM. In addition, the calculation time periods required for the read controller 910 to calculate extraction points after correction data is determined during the synchronization period are indicated by 1401 and 1402.

Shake information sampling can be done by executing interrupt processing using an internal timer of the COM with reference to vertical synchronization signals, and the time period required for such sampling is very shorter than those required for other calculations and the like. The correction amount is discretely calculated in synchronism with the sampling timings of the angular velocity information, and the use efficiency of the COM itself is poor. Such idle state of the COM frequently occurs if a large number of times of sampling of shake information is set.

More specifically, in case of, e.g., a standard video signal such as an NTSC signal or the like, sampling must be done around five to 10 times per field. For example, when a shake signal (angular velocity signal) is sampled 10 times per field, if about 16.7 ms as one field time period are equally divided into 10 periods, one sampling period is around 1.67 ms. The time period (duration 1201) required for calculations made in the COM falls within the range from about 0.3 to 0.8 ms although it largely depends on the specifications of the computer used. Hence, the ratio of the running time period of the computer to the period=1.67 ms between neighboring sampling timings falls within the range from about 18% to 48%, and the remaining time period which accounts for more than 50% of the whole time is an idle period.

Even when this idle period is used for another application, if that application requires continuous processing, such idle period is not suitable for the application since one field has already been divided into a plurality of periods. If calculation processing such as auto-focus control that occupies a continuous time period and has higher priority is done, the correction amount calculation timing cannot be completed before the next sampling timing, and consequently, one sampling data is lost, i.e., effective correction data cannot be obtained.

SUMMARY OF THE INVENTION

The present invention aims at solving the first problem, and has as its object to realize an image sensing apparatus and shake correction apparatus, which can prevent a drop of anti-shake effect resulting from a difference between the shake detection information sampling timing and shake correction timing, and can always obtain a high anti-shake effect independently of changes in image sensing condition, exposure condition, and the like such as a change in storage time period and the like.

According to the invention proposed to solve the first problem, there is provided an image sensing apparatus for electronically applying shake correction to sensed image data, and outputting corrected image data, comprising:

shake detection means for detecting a shake;

sampling means capable of sampling shake information detected by the shake detection means at a plurality of sampling timings within one field period of the image sensing apparatus;

selection means for selecting a shake information signal at one of the plurality of sampling timings, which corresponds to a drive condition of image sensing means at the time of image sensing;

correction control variable calculation means for calculating a shake correction control variable used in the shake correction by a predetermined calculation of the shake information signal selected by the selection means; and correction means for applying the shake correction to the sensed image data in accordance with the obtained shake correction control variable.

According to this image sensing apparatus, since the sampling timing is set in correspondence with the drive condition at the image sensing timing of the image sensing means, the difference between the shake detection information sampling timing and shake correction timing can be appropriately removed.

The above object can also be achieved by an image sensing apparatus comprising:

shake detection means for detecting a shake;

sampling means for sampling shake information detected by the shake detection means at a predetermined timing;

correction control variable calculation means for converting the shake information sampled by the sampling means into a shake correction control variable by a calculation;

read control means for controlling a read timing of an image sensing device on the basis of a calculation result of the correction control variable calculation means; and sampling timing control means for varying a sampling timing of the sampling means in accordance with a drive condition of the image sensing device.

According to a preferred aspect of the present invention, an operation phase of the sampling means is variable within a sampling interval.

The sampling timing preferably corresponds to nearly the central time during the storage time period of the image sensing means. Since the storage time period changes depending on the drive condition set in the image sensing means, the difference between the shake detection information sampling timing and shake correction timing can be appropriately removed.

According to a preferred aspect of the present invention, the correction means sets an image data extraction position of a temporary storage memory in the image sensing device that stores an image signal in correspondence with the shake correction control variable calculated by the correction control variable calculation means, and outputs image data read out from the extraction position as shake-corrected sensed image data.

The sampling timing can be set by various methods. For example, shake information sampled at a plurality of sampling timings via an A/D converter may be integrated, and one of integral results, which is suitable for the drive condition, may be selected.

Also, the sampling timing suitable for the drive condition may be set in the A/D converter.

An image sensing apparatus according to the present invention proposed to solve the second problem, comprises:

shake detection means for detecting a shake;

sampling means for sampling shake information detected by the shake detection means at a predetermined timing;

correction control variable calculation means for converting the shake information sampled by the sampling means into a shake correction control variable by a calculation;

read control means for controlling a read timing of an image sensing device on the basis of a calculation result of the correction control variable calculation means;

frequency detection means for detecting a frequency from the shake information obtained by the shake detection means; and sampling timing control means for varying a sampling timing of the sampling means in correspondence with the frequency detected by the frequency detection means.

Also, the second problem can also be solved by a shake correction apparatus comprising:

shake detection means for detecting a shake;

sampling means for sampling shake information detected by the shake detection means at a predetermined timing;

correction control variable calculation means for converting the shake information sampled by the sampling means into a shake correction control variable by a calculation;

read control means for controlling a read timing of an image sensing device on the basis of a calculation result of the correction control variable calculation means;

frequency detection means for detecting a frequency from the shake information obtained by the shake detection means; and sampling timing control means for varying a sampling timing of the sampling means in accordance with the frequency obtained by the frequency detection means.

The present invention proposed to solve the third problem has as its object to provide an image sensing method and apparatus which can implement shake correction, and allows a calculation means such as a microcomputer or the like to efficiently execute processing other than shake correction.

In order to achieve this object, an image sensing method according to the present invention, comprises:

image sensing method comprising:

the shake detection step of detecting a shake;

the sampling step of sampling shake information detected in the shake detection step at a plurality of predetermined even timings during one video period;

the shake correction control variable calculation step of converting the shake information sampled in the sampling step into a shake correction control variable by calculations at uneven timings in correspondence with the number of times of sampling; and the shake correction step of correcting a shake of an image sensing apparatus main body on the basis of a calculation result in the shake correction control variable calculation step.

The above object can also be achieved by an image sensing apparatus comprising:

shake detection means for detecting a shake;

sampling means for sampling shake information detected by the shake detection means at a plurality of predetermined even timings during one video period;

shake correction control variable calculation means for converting the shake information sampled by the sampling means into a shake correction control variable by calculations at uneven timings in correspondence with the number of times of sampling; and shake correction means for correcting a shake of an image sensing apparatus main body on the basis of a calculation result of the shake correction control variable calculation means.

Furthermore, the above object can be achieved by an storage medium that stores a control program for controlling an image sensing apparatus, the control program having control modules of the steps of:

detecting a shake of an image sensing apparatus main body;

sampling the detected shake information at a plurality of predetermined even timings during one video period;

converting the sampled shake information into a shake correction control variable by calculation at uneven timings in correspondence with the number of times of sampling; and correcting the shake of the image sensing apparatus main body on the basis of a calculation result of the shake correction control variable.

The above objects may be achieved in combination with each other. However, such combinations will be apparent from the appended claims that describe them.

BRIEF DESCRIPTION OF THE DRAWINGS

FIG. 5 is a timing chart for explaining operations from storage of an image sensing device until correction in the conventional image sensing apparatus;

FIG. 6 is a timing chart for explaining operations from storage of an image sensing device until correction upon operation of an electronic shutter in the conventional image sensing apparatus;

FIG. 7A shows the response characteristics with respect to frequency of an angular velocity sensor;

FIG. 7B is a timing chart showing the processing timings of the conventional image sensing apparatus;

FIGS. 25A and 25B show the response characteristics of an angular velocity sensor that constructs a shake detection means of the image sensing apparatus of the sixth embodiment;

FIG. 26 shows a look-up table for obtaining a sampling point and phase compensation amount on the basis of the shake frequency and shutter speed of the image sensing apparatus of the sixth embodiment.

DETAILED DESCRIPTION OF THE INVENTION

<First Embodiment>

The first embodiment of an image sensing apparatus according to the present invention will be described in detail below.

Figure 8:
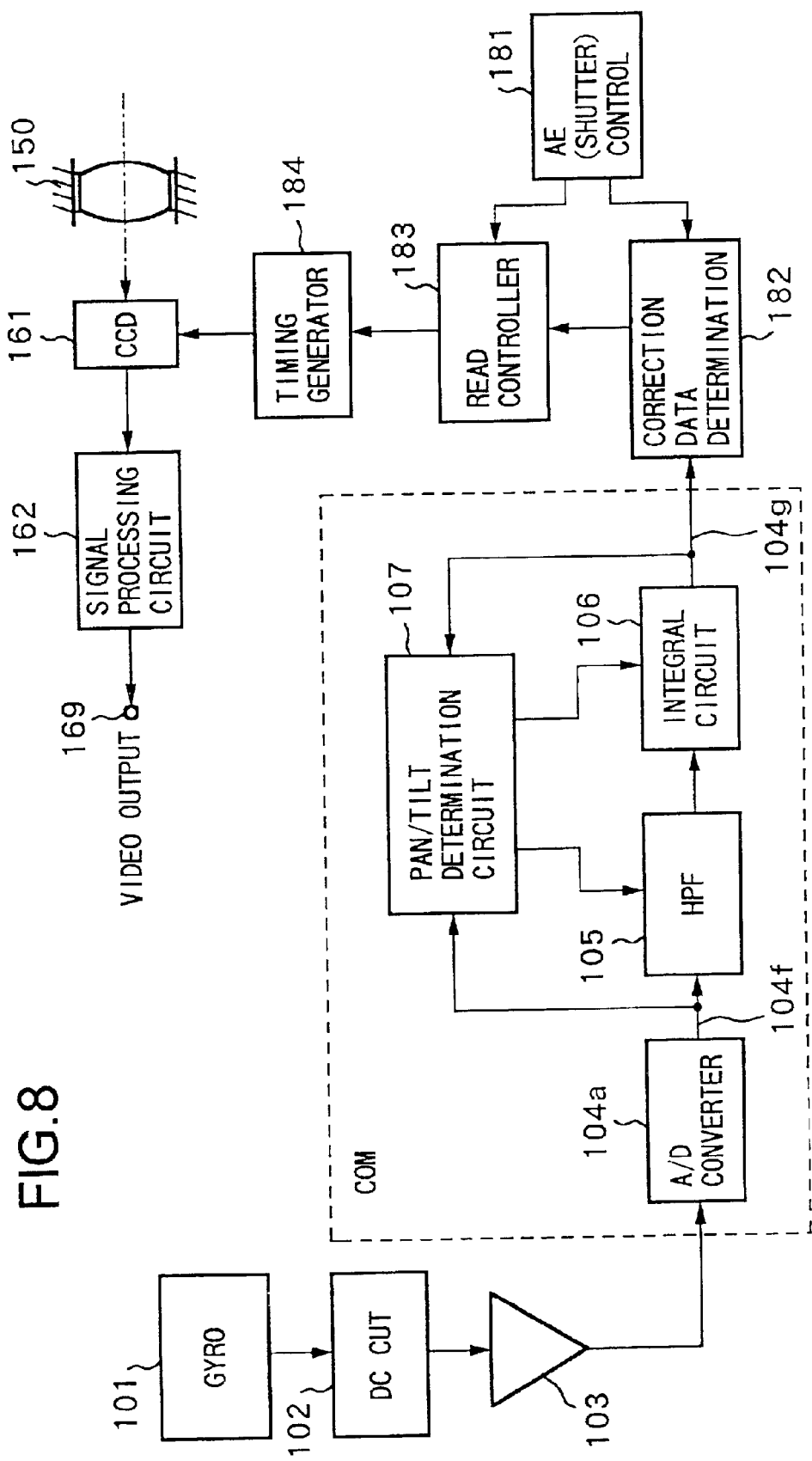
FIG. 8 is a block diagram showing a shake correction apparatus in the first embodiment of the present invention.

FIG. 8 is a block diagram showing a basic arrangement of a shake correction system of the image sensing apparatus according to the present invention. This image sensing apparatus is composed of an image sensing unit and camera shake correction unit. The image sensing unit (camera unit) has a lens 150, image sensing device 161, and signal processing circuit 162. The signal processing circuit 162 converts an electrical signal output from the image sensing device 161 into a standard video signal, and has a video output terminal 169, from which the standard video output is obtained.

The image sensing apparatus also has an angular velocity sensor 101 serving as a shake detection means, a DC cut filter 102, an amplifier 103, a computer (to be abbreviated as COM hereinafter) serving as a correction amount calculation means, an electronic shutter 181 serving as an AE control means, a read controller 183, a timing generator 184, and a correction data determination unit 182.

The angular velocity sensor 101 comprises, e.g., a vibration gyro as in the conventional image sensing apparatus main body, and detects any shake of the image sensing apparatus main body in two coordinate axes which are fixed with respect to the apparatus main body. In the description of FIG. 8 as well, two angular velocity signals will be explained as one angular velocity signal for the sake of simplicity.

The DC cut filter 102 cuts off DC components of an angular velocity signal output from the angular velocity sensor 101, and passes only AC components, i.e., shake components. The amplifier 103 appropriately amplifies the angular velocity signal output from the DC cut filter 102.

The COM has a microcomputer, and also has an A/D converter 104a, high-pass filter (HPF) 105, integral circuit or integrator 106, and pan/tilt determination circuit 107. These circuits make substantially the same operations as those of the conventional apparatus (FIG. 1).

Figure 1:
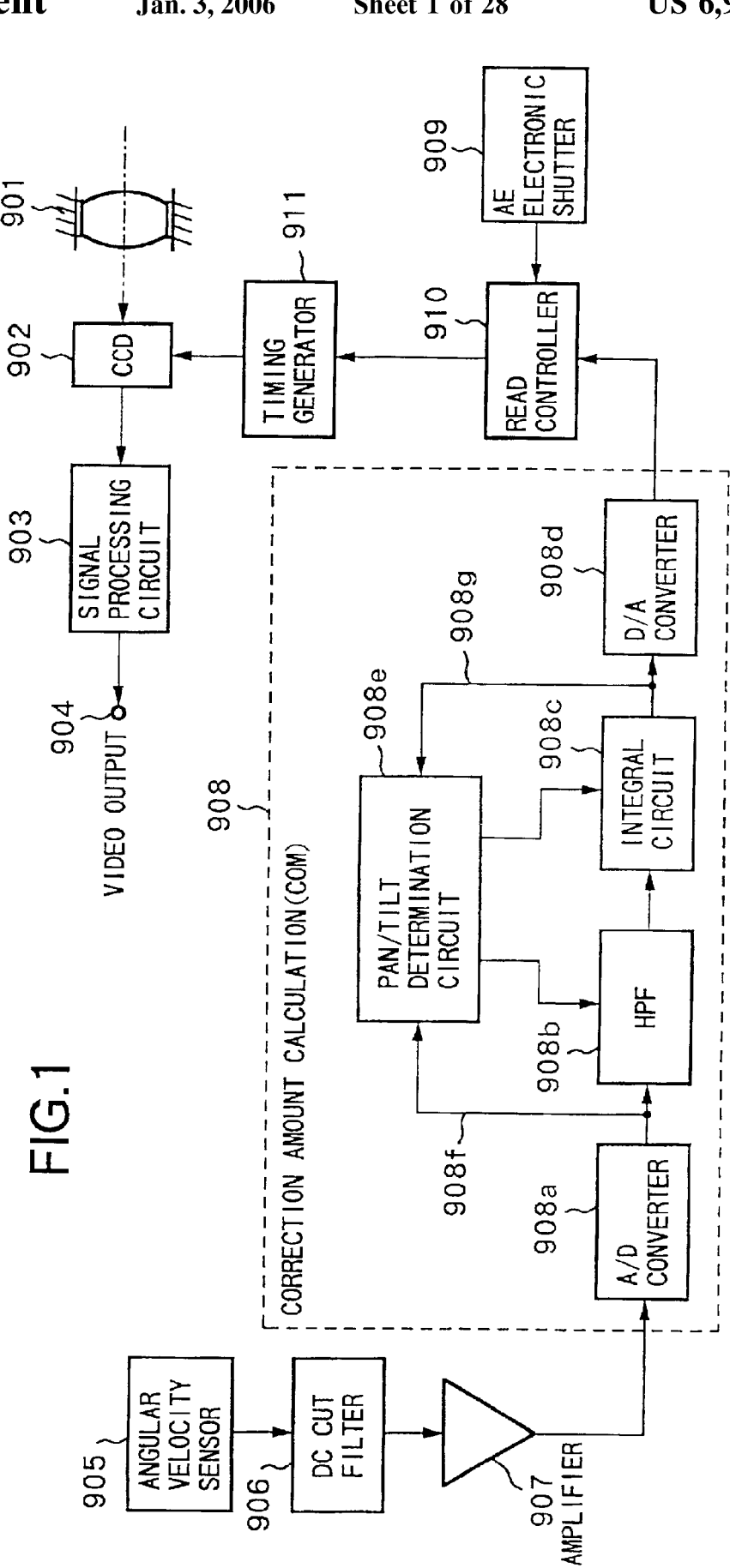
FIG. 1 is a block diagram showing the arrangement of a conventional image sensing apparatus.
Figure 2:
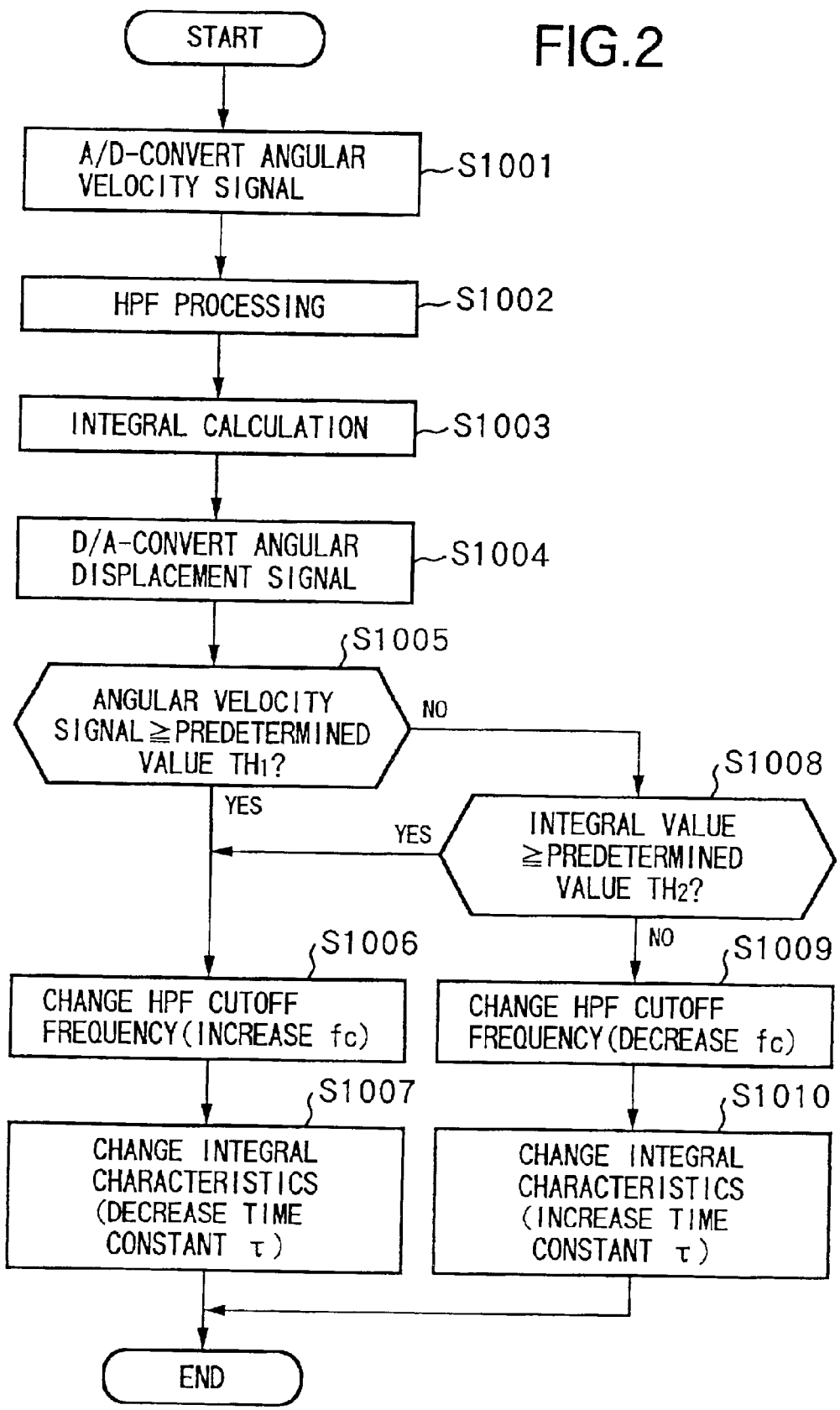
FIG. 2 is a flow chart showing pan determination sequence of a shake correction means in the conventional image sensing apparatus.
Figure 3:
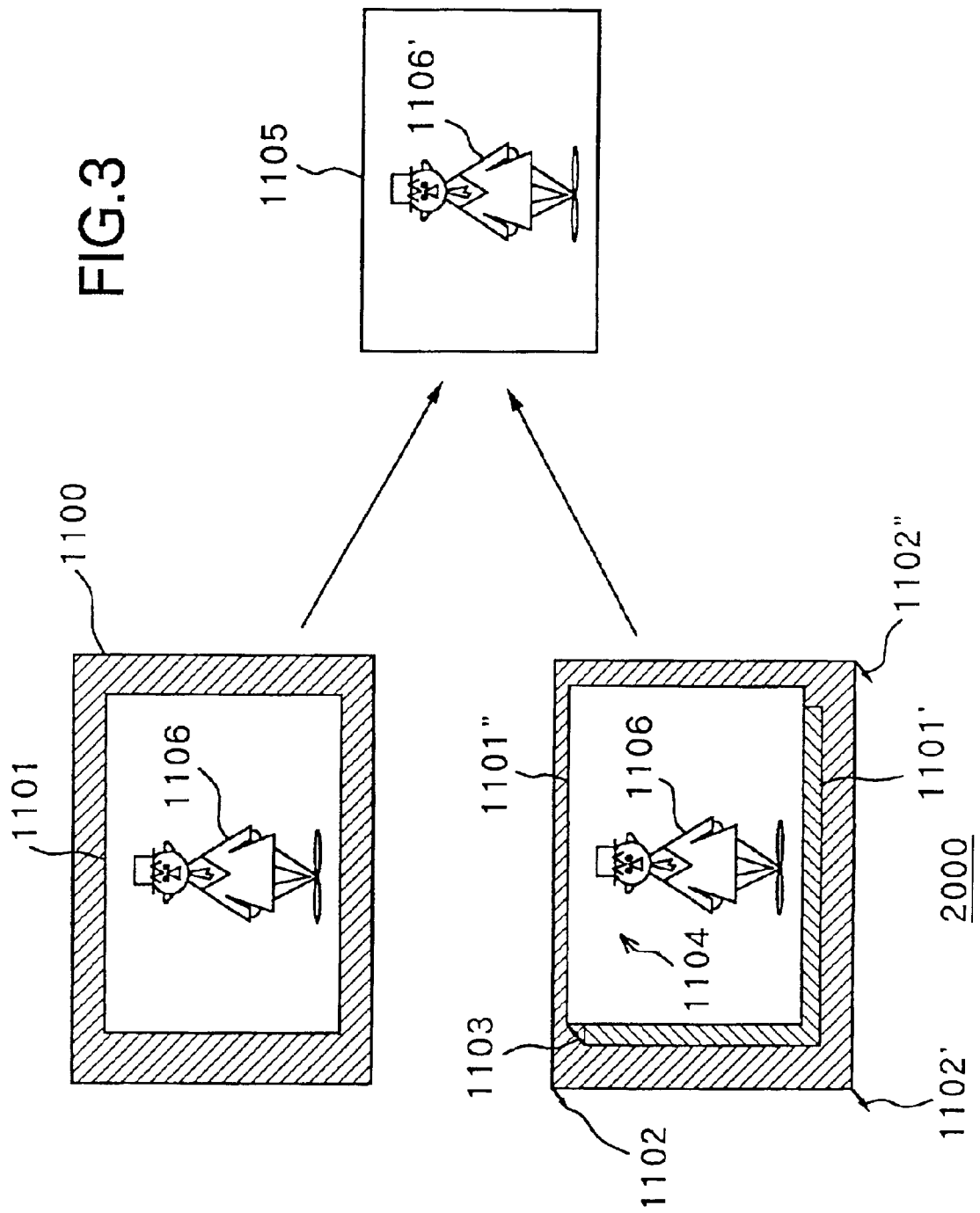
FIG. 3 is a view for explaining the outline of the shake correction means in the conventional image sensing apparatus.

Upon comparison between the arrangements of FIGS. 8 and 1, the apparatus of the embodiment shown in FIG. 8 further has the correction data determination unit 182. Note that the image sensing apparatus of the first embodiment has no D/A converter connected to the integrator 106 as compared to the conventional apparatus shown in FIG. 1. However, this difference is not essential, and in the apparatus shown in FIG. 8, the correction data determination unit 182 determines correction data on the basis of digital data from the integration circuit, and then converts it into an analog value.

Also, the read controller 183 in the image sensing apparatus of the first embodiment performs substantially the same operation as that of the controller 910 shown in FIG. 1. Hence, the image sensing apparatus of the first embodiment shown in FIG. 8 is characterized by the correction data determination unit 182. As will be described later, the correction data determination unit 182 determines the correction start timing in the read controller 183 in accordance with the storage start timing done by the electronic shutter 181, thus eliminating shortcomings resulting from the timing difference described previously in relation to FIG. 1.

To eliminate the shortcomings, the COM of the first embodiment samples angular velocity data a plurality of number of times within one field period and, hence, determines panning/tilting and updates the integral value by the integration circuit 106 the same number of times. That is, the correction data determination unit 182 receives an integral value output updated a plurality of number of times at predetermined timings from the integrator 106 within one field period.

The operation of the correction data determination unit 182 will be explained below with reference to the timing chart shown in FIG. 9.

Figure 9:
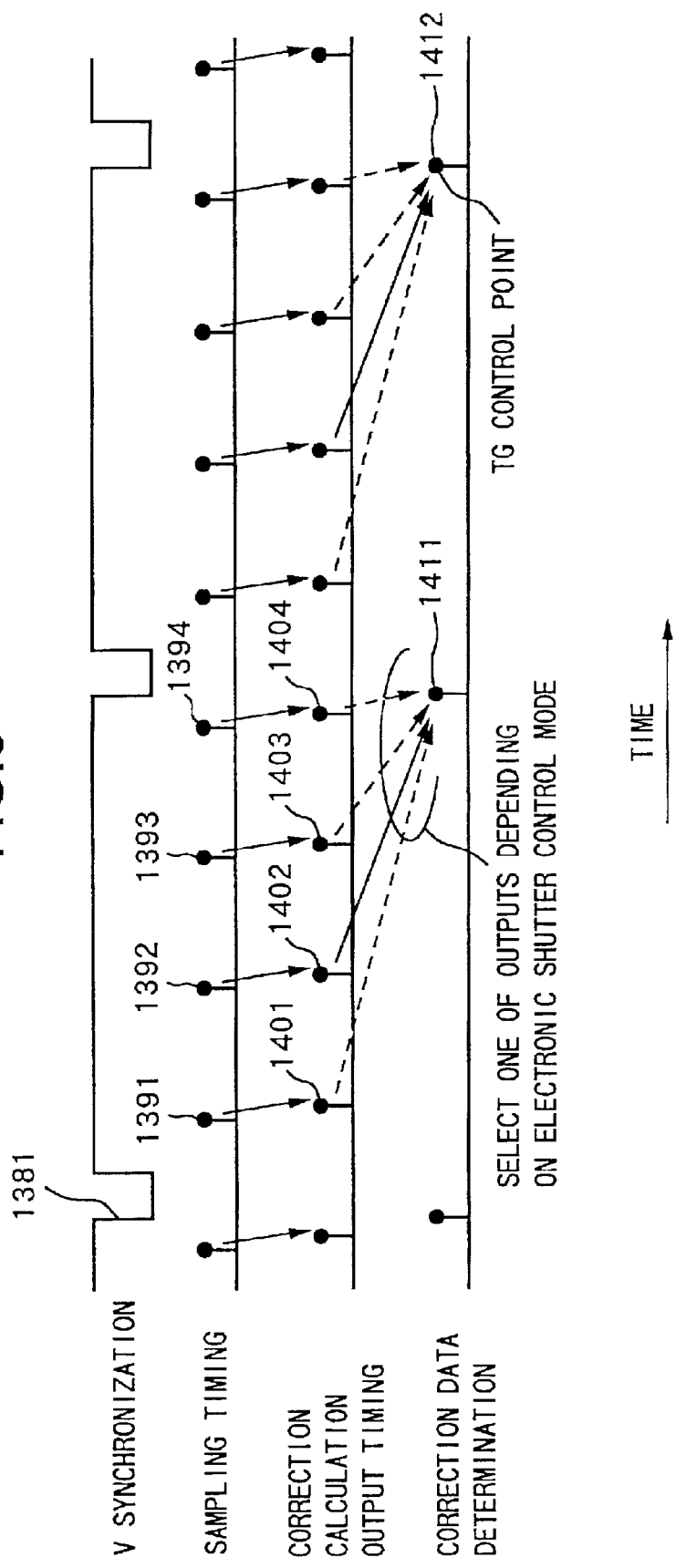
FIG. 9 is a timing chart for explaining the operation of a correction data determination means of the first embodiment.

Referring to FIG. 9, reference numeral 381 denotes a vertical (V) synchronization signal. Reference numerals 1391 to 1394 denote conversion timings (sampling timings) at which the A/D converter 104a converts an angular velocity signal obtained by the angular velocity sensor 101 into a digital amount 104f. For the sake of simplicity, FIG. 9 shows four sampling timings per field period at equal intervals. However, the number of times of sampling is not limited to four, but may be a plurality of number of times. Also, the interval need not be an equal interval as long as the phase relationship with the V synchronization signal 381 is appropriately set.

Four consecutive angular velocity signals 104f sampled at the timings 1391 to 1394 are converted into angular displacement signals at each sampling timing in the COM and panning control is made as in the prior art described above.

Such calculations in the COM are made at synchronous timings as the above-mentioned A/D conversion timings, i.e., at timings 1401 to 1404 shown in FIG. 9, thus obtaining updated integral outputs (104g) from the integrator 106. A calculation output that reflects the sampling value 1391 of the angular velocity is denoted by 1402, and a calculation output that reflects the sampling value 1392 of the angular velocity is denoted by 1403. In this way, a target calculation output that reflects the sampling data can be obtained from the COM at each sampling timing.

Figure 4:
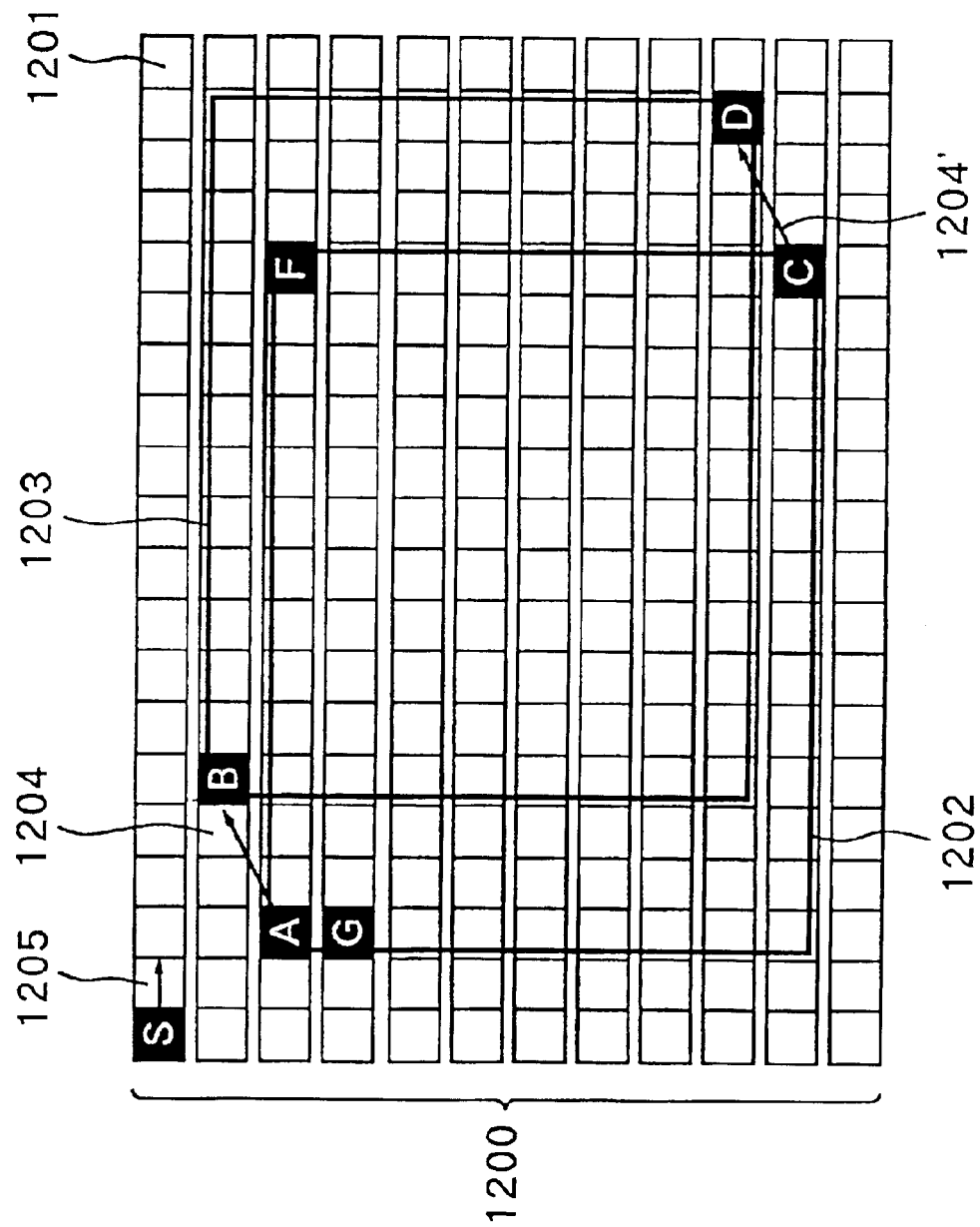
FIG. 4 is a view for explaining extraction of a stored image by the shake correction means in the conventional image sensing apparatus.

The correction data determination unit 182 selects one of integral value outputs 104g obtained at the timings 1401 to 1404, which are output from the CON. This selection depends on the control mode of the electronic shutter 181. More specifically, the correction data determination unit 182 determines which one of the integral outputs obtained at the timings 1401 to 1404 is used, depending on the fraction of a normal storage time period (a storage time period set when no electronic shutter operation is made) that the image sensing device 161 controlled by the electronic shutter 181 assigns to charge storage. For example, in case of FIG. 9, the correction data determination unit 182 selects the integral value output obtained at the timing 1402, determines it as correction data 1411, and uses the correction data 1411 in read control of the image sensing device in the next field, thus executing shake correction described previously with reference to FIG. 4.

The determination process of the correction data 1411 in FIG. 9 will be described below using FIG. 10 on the basis of the relationship with the storage time period (i.e., electronic shutter speed) of the image sensing device.

Figure 10:
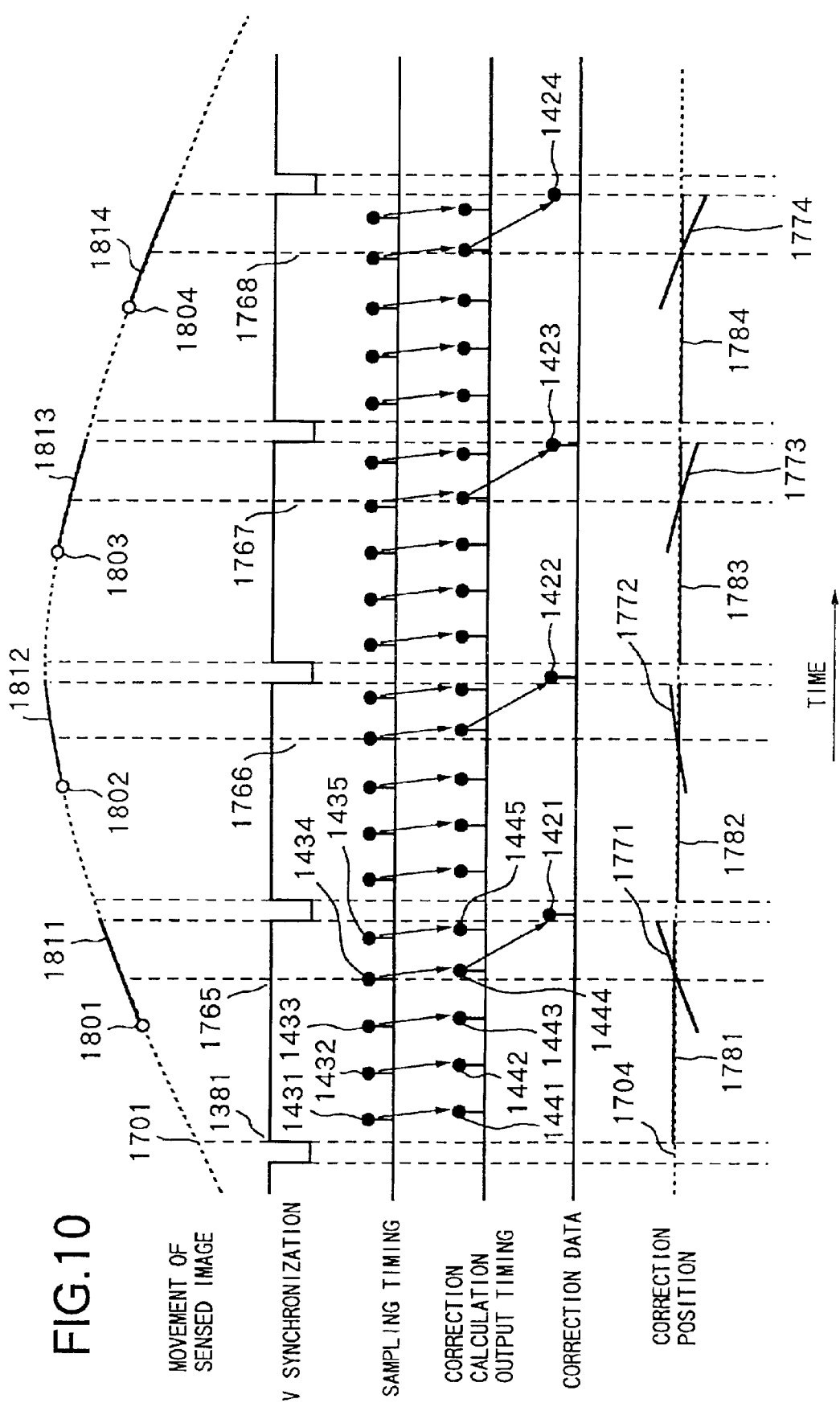
FIG. 10 is a timing chart for explaining operations from storage of an image sensing device until correction upon operation of an electronic shutter in the first embodiment.

FIG. 10 shows movement of an image stored in the image sensing device and extraction timing, as in FIG. 6 mentioned above, and the same storage control of the image sensing device as in the above description is made.

Unlike FIG. 6, FIG. 10 is characterized in that the integral output data used in image extraction for correction is obtained at nearly the central time of the charge storage period of the image sensing device 161.

If angular velocity signals are sampled at timings 1431 to 1435 within one field, integral results based on these sampled angular velocity signals are obtained at timings 1441 to 1445. Note that reference numeral 1765 denotes the central time of a time period 1811 required for actual charge storage in the first field in FIG. 10 in the image sensing device 161. The correction data determination unit 182 selects the sampling point 1434 close to this timing 1765, in other words, it selects the integral result obtained at the timing 1444 from those obtained at the timings 1441 to 1445.

Since the electronic shutter operation requires charge accumulation time periods 1811 to 1814 for the CCD 161, an image observed during these storage time periods has displacements 1771 to 1774. The integral values of these image displacements 1771 to 1774 have values 1781 to 1784 (corresponding to barycentric positions). The timings at which the image displacements 1771 to 1774 change and assume values corresponding to the barycentric positions nearly match central times 1776 to 1768 of the charge storage time periods 1811 to 1814. In other words, the timing at which the image is displaced during operation of the electronic shutter is located at the barycentric position is the sampling timing of angular velocity information, i.e., matches the central time of the charge storage time period. As a result, a time mismatch (FIG. 6) described in the above prior art can be prevented. Compared to the prior art, the differences between the displacement barycentric values (1781 to 1784) and correction reference position 1704 are much smaller than those between the correction reference position 1327 and displacement barycentric positions 1322 to 1335 during the actual storage time periods of the image sensing device described with reference to FIG. 6.

Hence, the sampling timing is not fixed at nearly the central time of the synchronization period unlike the prior art, but instead, the integral value output (the output from the integrator 106) based on the angular velocity sampled at nearly the central time of the actual storage time period after the electronic shutter is turned off (i.e., after charge storage has been actually started) is selected, thus obtaining high anti-shake performance.

In the first embodiment, since the calculation result of the correction target value determined by the correction data determination unit 182 depends on the shutter speed selected by the electronic shutter 181, unique selection data corresponding to the shutter speed may be prepared.

The correction data determination unit 182 may be constructed by a gate that receives the shutter speed of the electronic shutter as a control input. More specifically, the time duration from the V synchronization signal until that gate opens is determined in correspondence with the input shutter speed information.

The same applies when a change in the synchronization interval of the image sensing apparatus itself is used as a control input instead of the electronic shutter operation.

<Modification of First Embodiment> . . . First Modification

Figure 11:
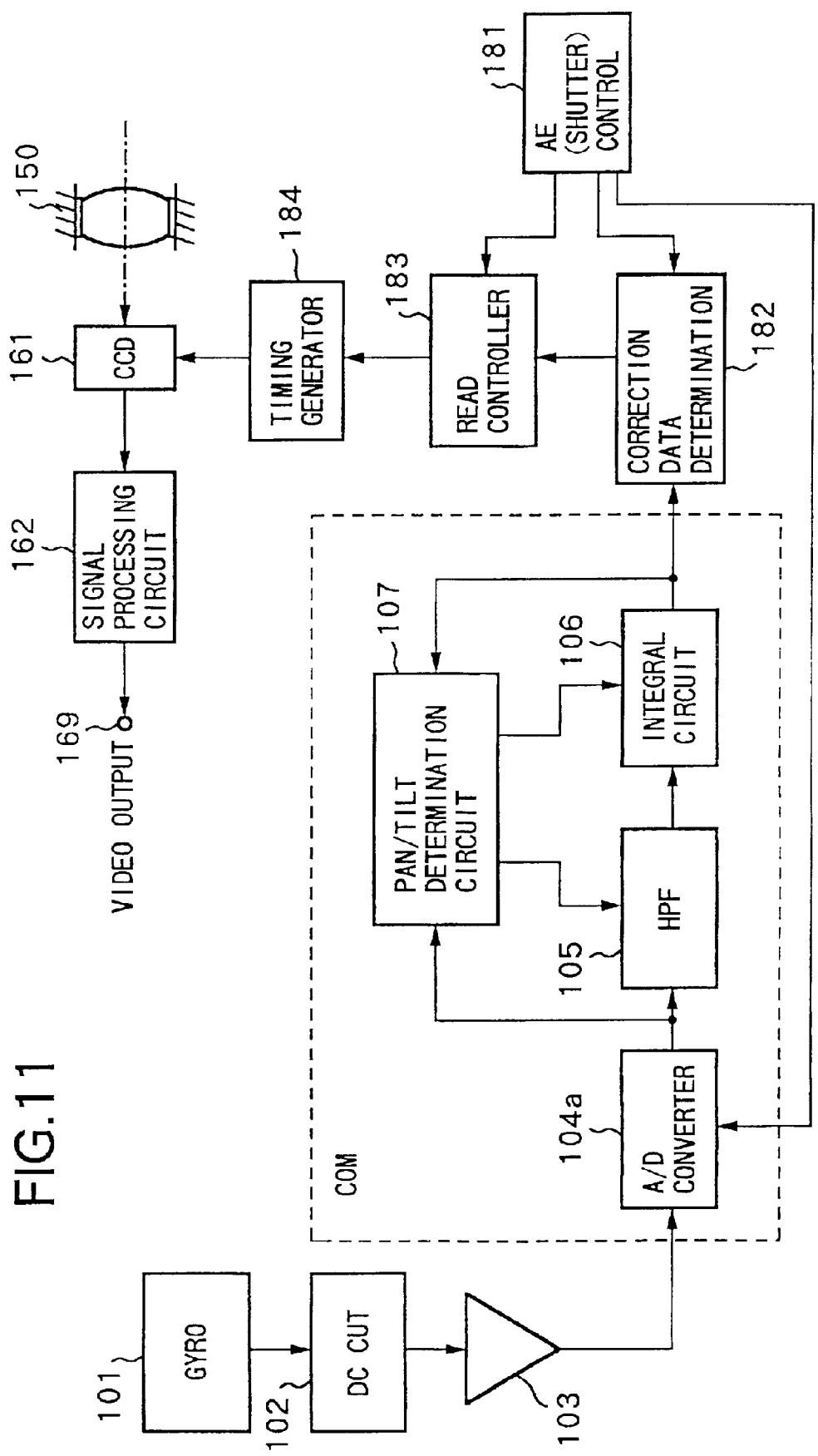
FIG. 11 is a block diagram showing a shake correction apparatus in a modification (first modification) of the first embodiment of the present invention.

FIG. 11 is a block diagram showing the basic arrangement of the shake correction system of the image sensing apparatus according to a modification of the first embodiment.

The same reference numerals in FIG. 11 denote the same parts as in the first embodiment mentioned above, and a detailed description thereof will be omitted.

Referring to FIG. 11, this modification is different from the first embodiment in that the A/D converter 104a can receive and detect the operation timing of the electronic shutter 181 therefrom. More specifically, a control signal of the electronic shutter 181 is supplied to the A/D converter 104a to control the sampling timing of the A/D converter 104a.

As can be seen from the description of the first embodiment, the correction timing for shake correction largely depends on the timing of the electronic shutter, in other words, the sampling timing of the angular velocity signal can be determined if the electronic shutter timing is determined. However, since the electronic shutter timing can be arbitrarily set by the user, if a large number of angular velocity sampling timings are set in correspondence with such arbitrary electronic shutter timings, the overall apparatus becomes bulky. Hence, in this modification, four sampling timings corresponding to four different (N different, in principle) shutter speeds are set, and if a shutter speed other than these four different shutter speeds is used, one of the four sampling timings is used after correction, thus simplifying the apparatus.

Figure 12:
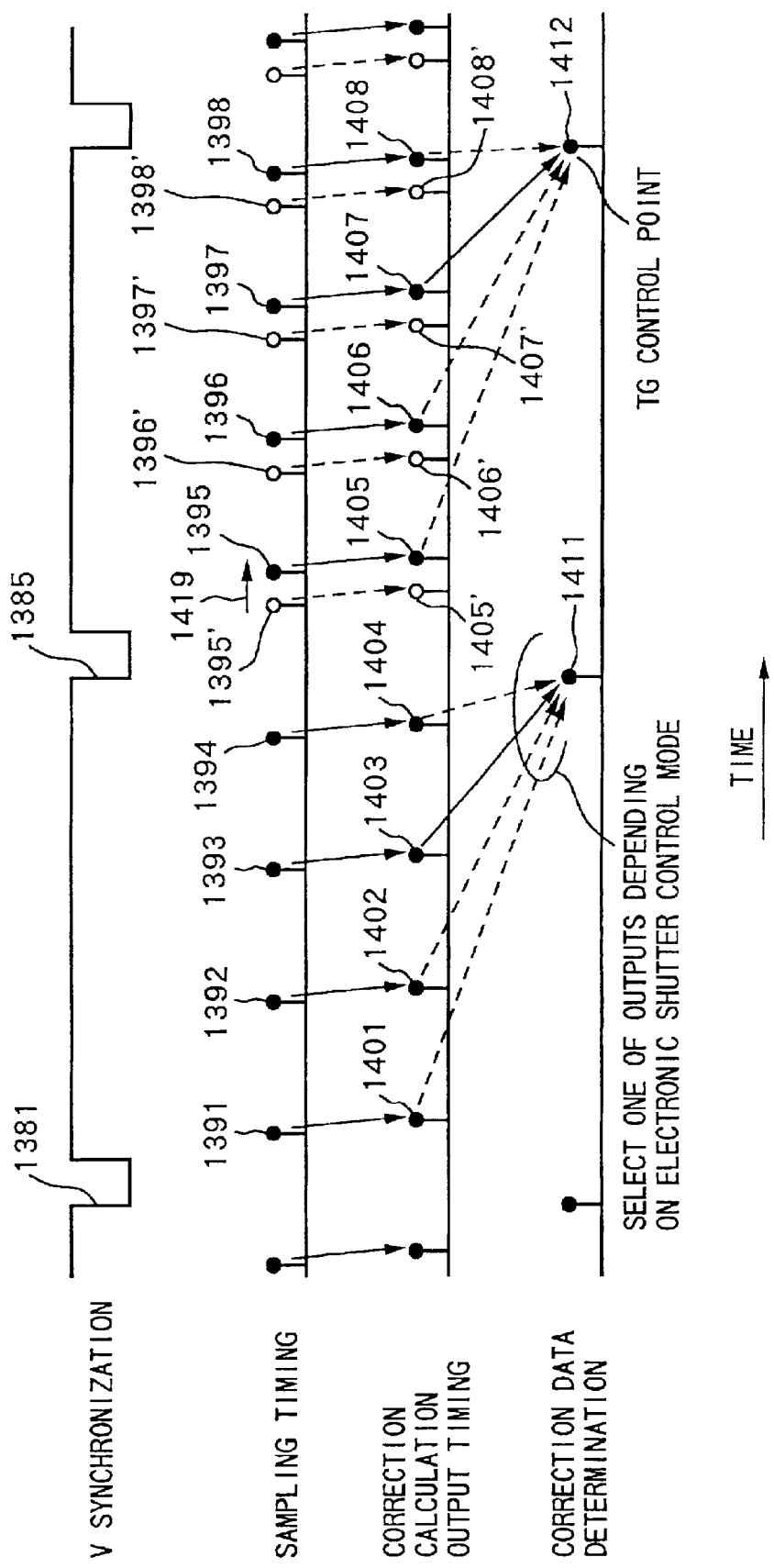
FIG. 12 is a timing chart for explaining operations from storage of an image sensing device until correction upon operation of an electronic shutter in the first modification.

FIG. 12 is a view for explaining the operation of the correction data determination unit 182 as in FIG. 9, and also explaining the operation timing of the A/D converter 104a.

Referring to FIG. 12, reference numeral 1381 denotes a vertical synchronization signal. Reference numerals 1391 to 1398 denote conversion timings (sampling timings) at which an angular velocity signal obtained by the angular velocity sensor 101 is converted into a digital amount by the A/D converter 104a. The angular velocity information sampled at each sampling timing is converted into angular velocity information in units of samples in the COM as in the first embodiment. Such calculations in the COM are made at synchronous timings as the A/D conversion timings, and integral calculation outputs of the integrator 106 are obtained at timings 1401 to 1408 in FIG. 12.

The correction data determination unit 182 selects an optimal point as an extraction position for camera shake correction from the timings 1401 to 1404 (or 1405 to 1408) on the basis of the shutter speed. In FIG. 12, since the user has selected shutter speed S(n) (n is a value ranging from 1 to 4 in the example in FIG. 12), the timing 1403 corresponding to that speed is selected, and an integral result is used in image correction at a timing 1411 corresponding to the timing 1403.

When the user has changed the shutter speed from S(n) to S'(n) (≠S(n)), the timing 1403 is not to be selected. If there is n' for which S'(n)=S(n') holds, a sampling timing corresponding to such S(n') can be selected. This is because the sampling timing corresponding to S(n') matches the sampling timing of the A/D converter 104a at nearly the central time of the actual storage time period of the image sensing device.

If there is no n' for which S'(n)=S(n') holds, this modification delays the sampling timing of the A/D converter 104a by a time period corresponding to the shutter speed difference {S(n)–S'(n)}, as shown in FIG. 12. In FIG. 12, 1395' to 1398' indicate the A/D conversion timings before being delayed, and 1405' to 1408' indicate the output timings of the integral results. The A/D converter receives information that pertains to the changed shutter speed (=S'(n)) from the electronic shutter, A/D-converts the information at timings 1395 to 1398 with a delay of a time interval 1419, and outputs the integral results at timings 1405 to 1408.

The correction calculation result output timings 1405 to 1408 as the following processing are those obtained based on the outputs from the A/D converter 104a at the central times of charge storage time periods, i.e., no time difference is produced.

In this embodiment, since the delay amount determined by the correction data determination unit 182 depends on the shutter speed selected by the electronic shutter 181, unique selection data corresponding to the shutter speed may be prepared.

The timing can be delayed using a presettable counter. More specifically, a plurality of different delay time values corresponding to different change amounts of the shutter speed are stored as data, and when the shutter speed has changed, a delay time value corresponding to that change amount is set in the counter. When the counter overflows, the output from the integrator 106 is received.

<Effect of First Embodiment>

As described above, according to the image sensing apparatus of the first embodiment, since an apparatus for attaining shake correction by controlling the image read timing on the basis of the shake correction amount calculated based on the detected shake information comprises a correction data determination means for selecting the shake correction amount at a timing which varies depending on the drive condition of an image sensing device such as an electronic shutter operation, and supplying the selected shake correction amount to a read control means, a sufficiently high anti-shake effect can be obtained even when storage & read control of the image sensing device is done based on the electronic shutter operation.

Since shake information is sampled at a timing corresponding to nearly the central time of the storage time period of the image sensing device, there is no timing difference between shake detection and shake correction, thus obtaining a maximum anti-shake effect.

<Second Embodiment>

In the first embodiment and its modification, a plurality of different (N) sampling timings are set in advance in correspondence with different shutter speeds, and the angular velocity is sampled at these sampling timings during each field period to obtain N angular velocity signals. The N angular velocity signals undergo HP processing, and the obtained N time-sequential angular velocity signals undergo N continuous integral calculations to obtain N integral values.

In the second embodiment, one sampling timing (e.g., timing 1434 in FIG. 10) is selected in correspondence with the shutter speed, and the A/D converter 104a A/D-converts angular velocity data at that selected A/D conversion timing. Then, the A/D-converted data is processed via a high-pass filter and integrated as in the COM shown in, e.g., FIG. 8. The second embodiment is different from the first embodiment in that only one angular velocity data is processed within one field period. The obtained integral result is received by the correction data determination unit 182 at a timing (e.g., timing 1444 in FIG. 10) a prescribed period of time after the A/D conversion timing.

Figure 13:
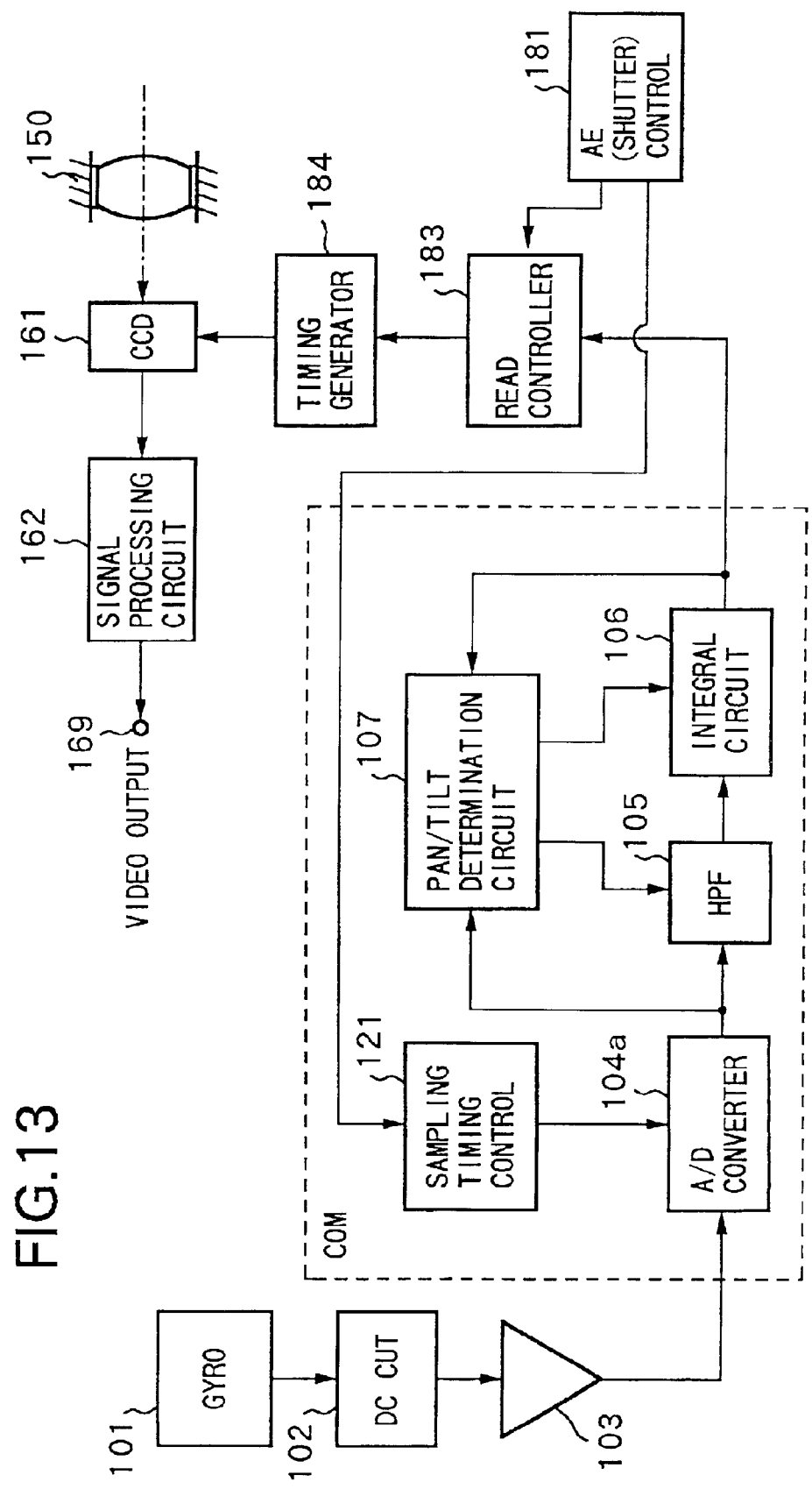
FIG. 13 is a block diagram showing a vibration correction apparatus in the second embodiment of the present invention.

FIG. 13 is a block diagram showing the basic arrangement of a shake correction system of an image sensing apparatus according to the second embodiment.

The same reference numerals in FIG. 13 denote the same parts as those in the first embodiment, and a detailed description thereof will be omitted. Referring to FIG. 13, unlike the arrangement of the first embodiment (FIG. 8), the second embodiment does not have any correction data determination unit 182 of the first embodiment. For this reason, in the image sensing apparatus of the second embodiment, one sampling timing of the A/D converter is set within one field period unlike the first embodiment.

The difference between the arrangements of the second embodiment and prior art (FIG. 1) lies in that a sampling timing controller 121 is added to the second embodiment.

The operation of the sampling timing controller 121 will be explained below with reference to the timing chart in FIG. 14.

Figure 14:
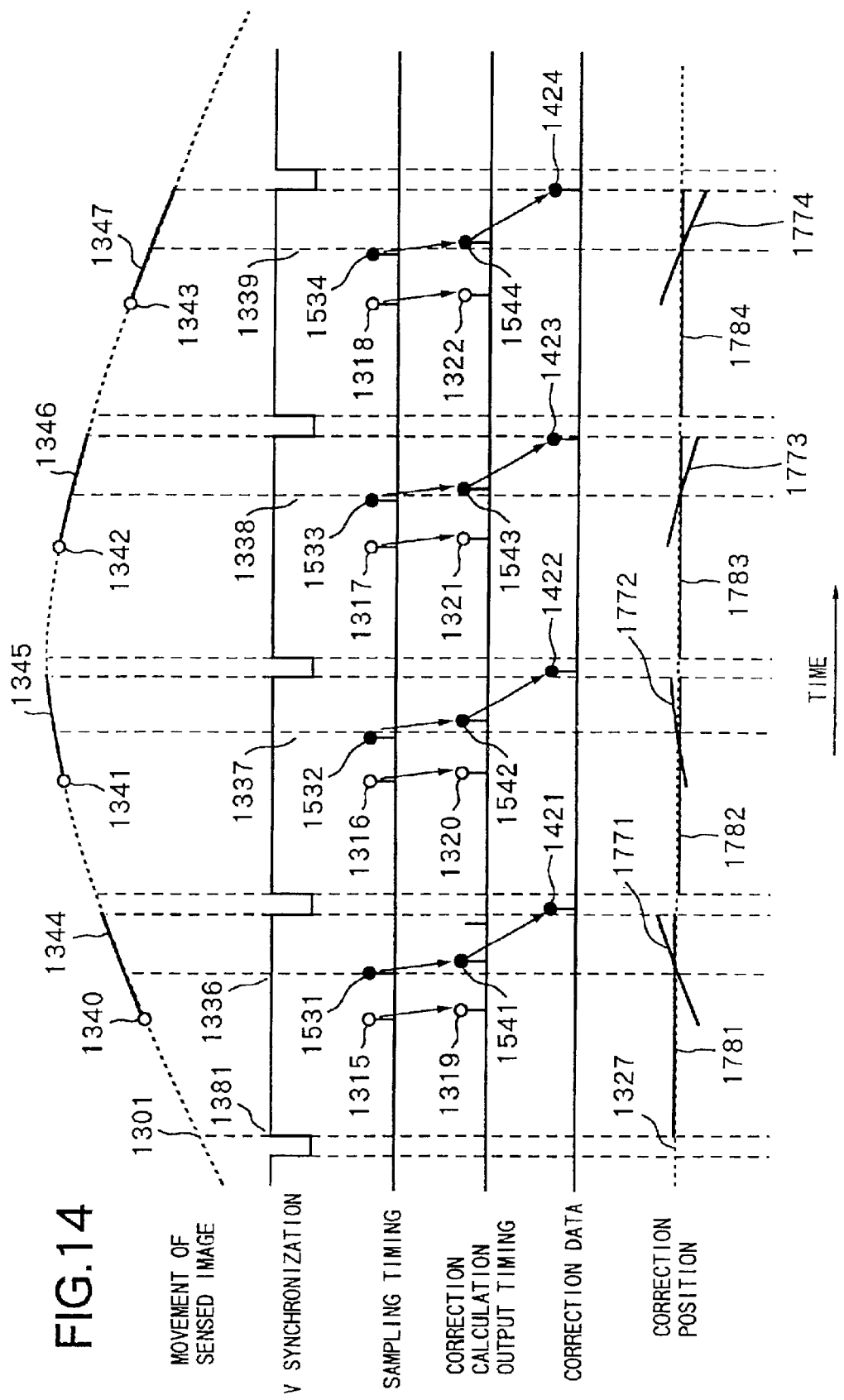
FIG. 14 is a timing chart for explaining operations from storage of an image sensing device until correction upon operation of an electronic shutter in the second embodiment.

FIG. 14 shows movement of an image stored in the image sensing device and extraction timings along with an elapse of time as in FIG. 6 explained previously, and the same storage control of the image sensing device as in the above description is made.

The sampling timing controller 121 sets the sampling timing of shake data (angular velocity data) at nearly the central time in the storage time period of the image sensing device on the basis of information that pertains to the shutter speed and received from the electronic shutter 181.

Reference numeral 1531 to 1534 denote sampling timings within the respective fields, which are set by the sampling timing controller 121. Compared to the sampling timings 1315 to 1318 described in FIG. 6, the timings 1531 to 1534 in FIG. 14 are shifted to the timings 1336 to 1339 indicating the storage central times of the image sensing device.

The integrator 106 of the second embodiment calculates correction target values (integral values) on the basis of shake information sampled at the timings 1531 to 1534, and outputs the calculation results at timings 1541 to 1544.

Compared to the displacement barycentric positions 1332 to 1335 in the actual storage time periods of the image sensing device described previously with reference to FIG. 6, displacement barycentric positions 1781 to 1784 according to the second embodiment shown in FIG. 14 are closer to a correction reference position 1327.

The time delay amount set by the sampling timing controller 121 is uniquely determined based on the operation mode of the electronic shutter 181, i.e., the actual storage time. Hence, the sampling timing controller 121 can determine the sampling timing when sampling phases corresponding to operation modes of the electronic shutter are prepared as data, or are calculated on the basis of the actual storage time period.

Since the sampling timing controller 121 adjusts the sampling point of data to be selected to nearly the central time of the actual storage time period of the image sensing device without fixing the sampling timing at nearly the central time between adjacent synchronization signals in the prior art, high anti-shake characteristics can be assured.

The same applies when a change in the synchronization interval of the image sensing apparatus itself is used as a control input instead of the electronic shutter operation.

The second embodiment calculates the correction target value immediately after the sampling timing of a shake signal. However, since the calculation for obtaining the correction target value need only be finished before the next extraction control, it need not be made immediately after sampling.

<Third Embodiment>

Figure 15:
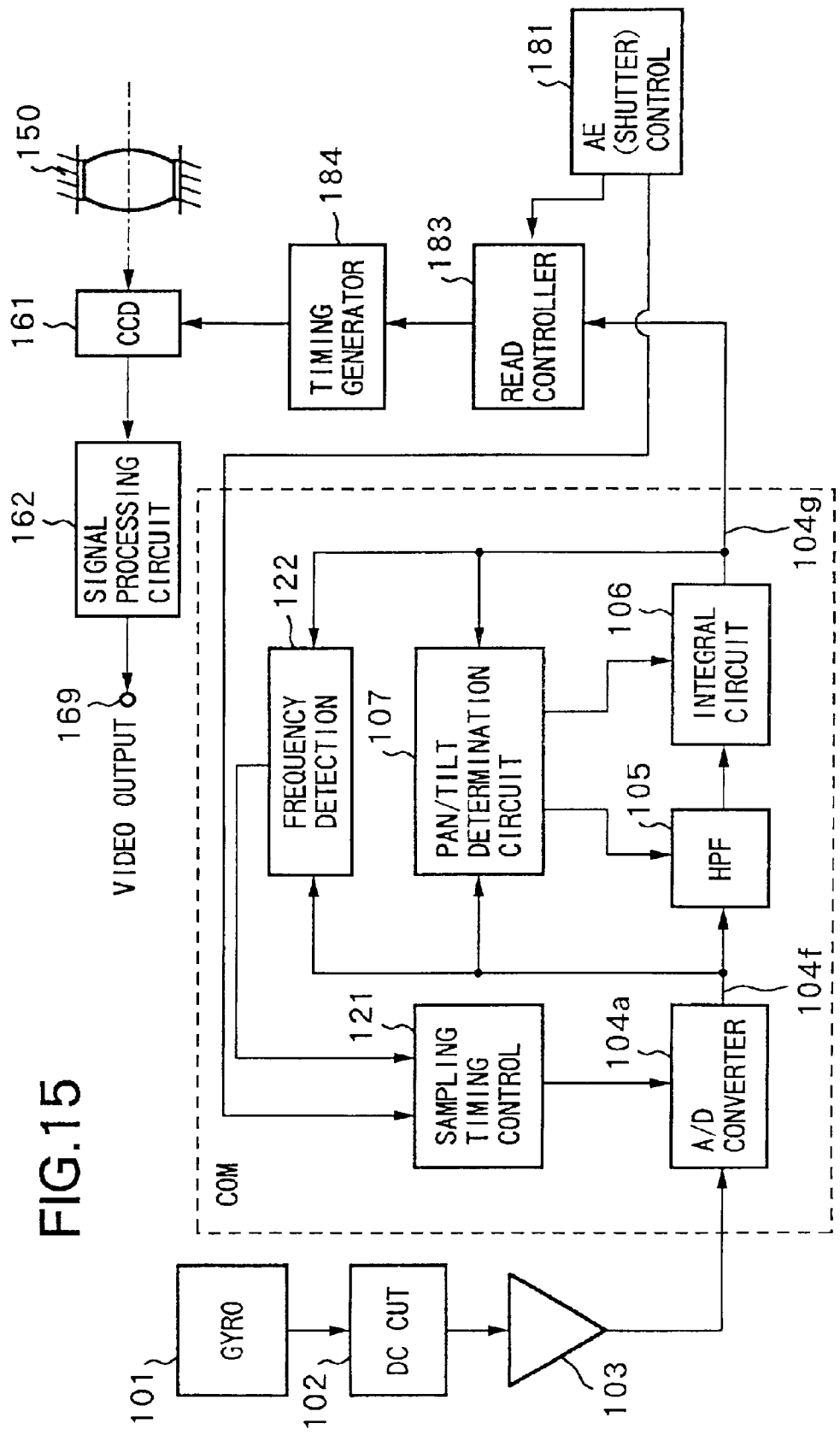
FIG. 15 is a block diagram showing a vibration correction apparatus in the third embodiment of the present invention.

The third embodiment of an image sensing apparatus according to the present invention will be described in detail below with reference to FIG. 15.

The image sensing apparatus of the third embodiment has been proposed to remove correction delays resulting from any response delay of the gyro 101 serving as a sensor. For this purpose, the third embodiment is characterized by further comprising a detector 122 for detecting a frequency component in an angular velocity signal, in addition to the second embodiment.

The frequency detector 122 makes a computation such as FFT, and detects the average value of a plurality of frequencies, which are detected as those having power levels equal to or higher than a predetermined power level. The frequency component in the angular velocity signal detected by the detector 122 is supplied to the timing controller 121.

The frequency detector 122 also detects a frequency component in integrated angular velocity data, i.e., a displacement amount 104g. Such detection is made in consideration of a certain tendency of the angular velocity sensor 101: the sensor 101 outputs a signal with a high output level in response to an angular velocity change with a high frequency, and outputs a signal with a low-output level in response to an angular velocity change with a low frequency. That is, in order to accurately detect a low frequency component, it is effective to use the signal 104g as an integral, the signal level of which has been apparently amplified.

Note that the detector 122 may use a method using the count value of sign changes in signals per unit time period as a simple frequency detection method.

Shake frequency information detected by the frequency detector 122 is used by the sampling timing controller 121 to control to generate a sampling timing, which is advanced by a predetermined phase corresponding to the detected frequency.

More specifically, since the sampling phase need be advanced by the response delay angle (FIG. 7A) of the angular velocity sensor 101 as the shake detection means, if a shake of 10 Hz acts on the image sensing apparatus and the phase delay of the angular velocity sensor is 9 deg on the basis of the characteristics shown in FIG. 7A, the angular velocity sensor output has a delay time of 0.25 ms as per:

$$\frac{9[\text{deg}]}{360[\text{deg}]} \times 10[\text{Hz}] = 0.25[\text{ms}]$$

Hence, the sampling timing controller 121 suffices to advance the sampling timing by 0.25 ms.

The operation of the sampling timing controller 121 according to the third embodiment will be described below with the aid of FIG. 16.

Figure 16:
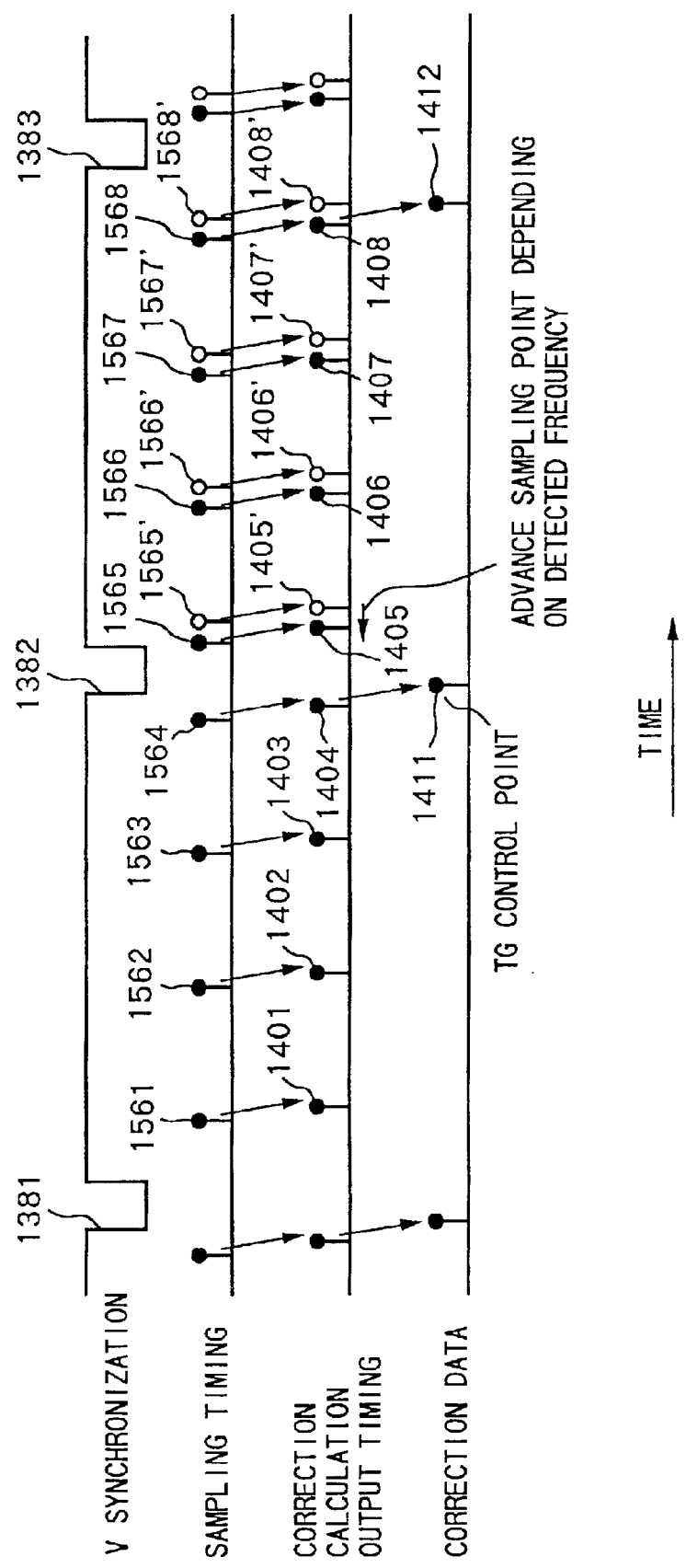
FIG. 16 is a timing chart for explaining operations from storage of an image sensing device until correction in the third embodiment.

Referring to FIG. 16, unlike the second embodiment described above using FIG. 14 and the like, a plurality of sampling points must be set within one field to improve the frequency detection precision. In the third embodiment, four sampling points are set per field for the sake of convenience, but the number of sampling points is not particularly limited.

In FIG. 16, reference numeral 1561 to 1568 denote the sampling points of a shake signal. Normal sampling is done between a vertical synchronization timing 1381 and the next synchronization timing 1382.

When the frequency detector 122 detects a higher shake frequency in the output from the A/D converter 104a, the timing controller 121 controls to advance the sampling point of the shake signal in correspondence with the detected shake frequency, as described above. At the next synchronization timing 1382 and subsequent timings, the sampling timings are changed to timings 1565 to 1568 which lead standard timings 1565' to 1568' by a predetermined period of time.

Similarly, the correction calculation result output timings are changed from output timings 1405' to 1408' for previous fields to timings 1405 to 1408. However, the phases of control points 1411 and 1412 for image extraction remain unchanged with respect to the calculation timings.

<Effect of Third Embodiment>

As described above, according to the image sensing apparatus of the third embodiment, since appropriate shake information can be sampled by varying the sampling timing of a sampling means in correspondence with the drive & storage conditions of the image sensing device such as electronic shutter operation, frequency information obtained by a shake detection means, and the like, smooth anti-shake operation can be done independently of the drive & storage conditions of the image sensing device, shake frequency, and the like.

<Fourth Embodiment>

The fourth embodiment has been proposed to solve the third problem with the prior art. More specifically, an image sensing apparatus of the fourth embodiment can effectively use a COM in processing other than that for obtaining a correction amount.

Figure 17:
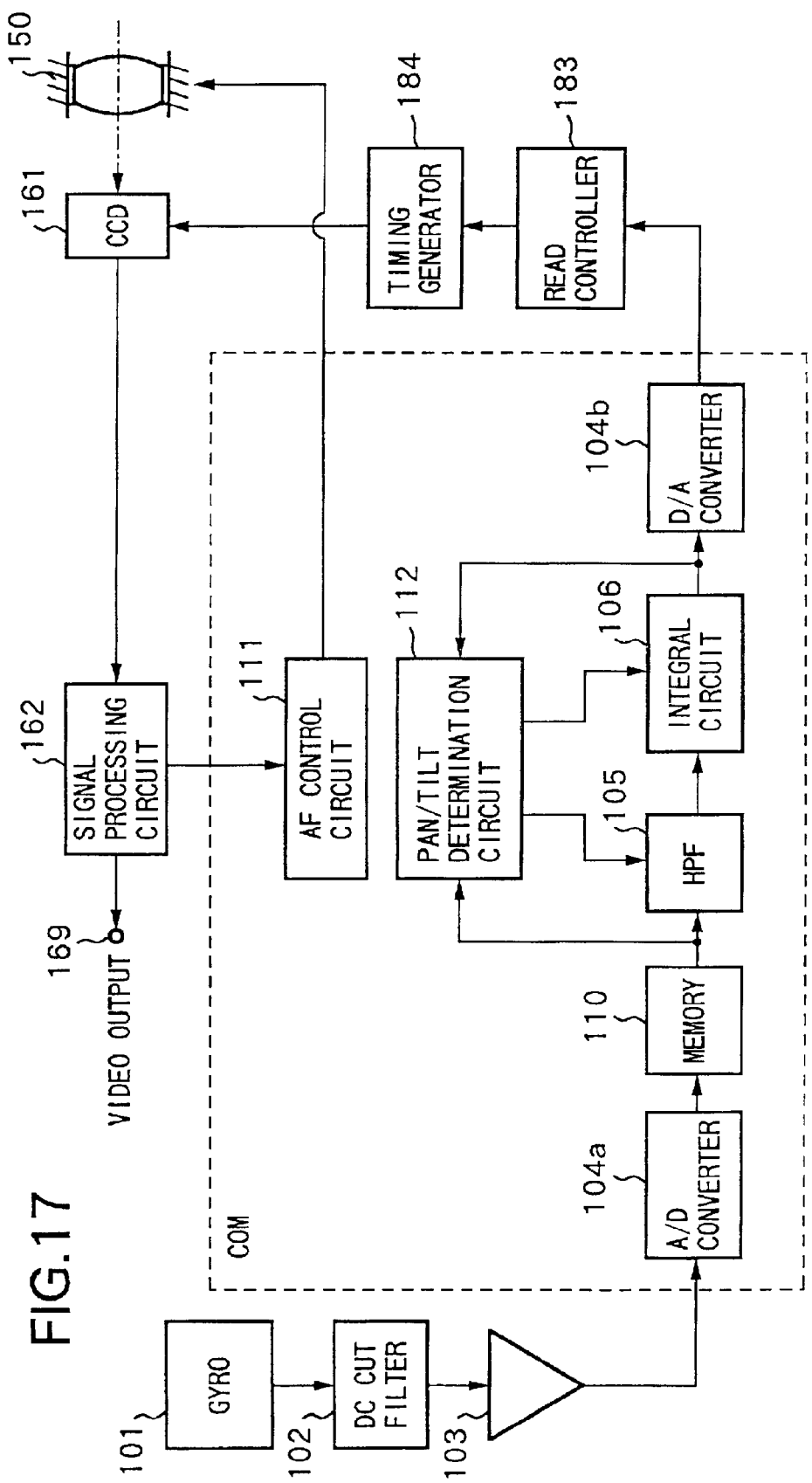
FIG. 17 is a block diagram showing the arrangement of an image sensing apparatus according to the fourth embodiment of the present invention.

FIG. 17 shows the arrangement of the image sensing apparatus of the fourth embodiment. The same reference numerals in FIG. 17 denote the same parts as those in the aforementioned embodiments.

The apparatus arrangement of the fourth embodiment shown in FIG. 17 is different from that of the first embodiment shown in FIG. 8 in that a memory 110 and AF (auto-focus) control circuit 111 are added in the COM.

Figure 19:
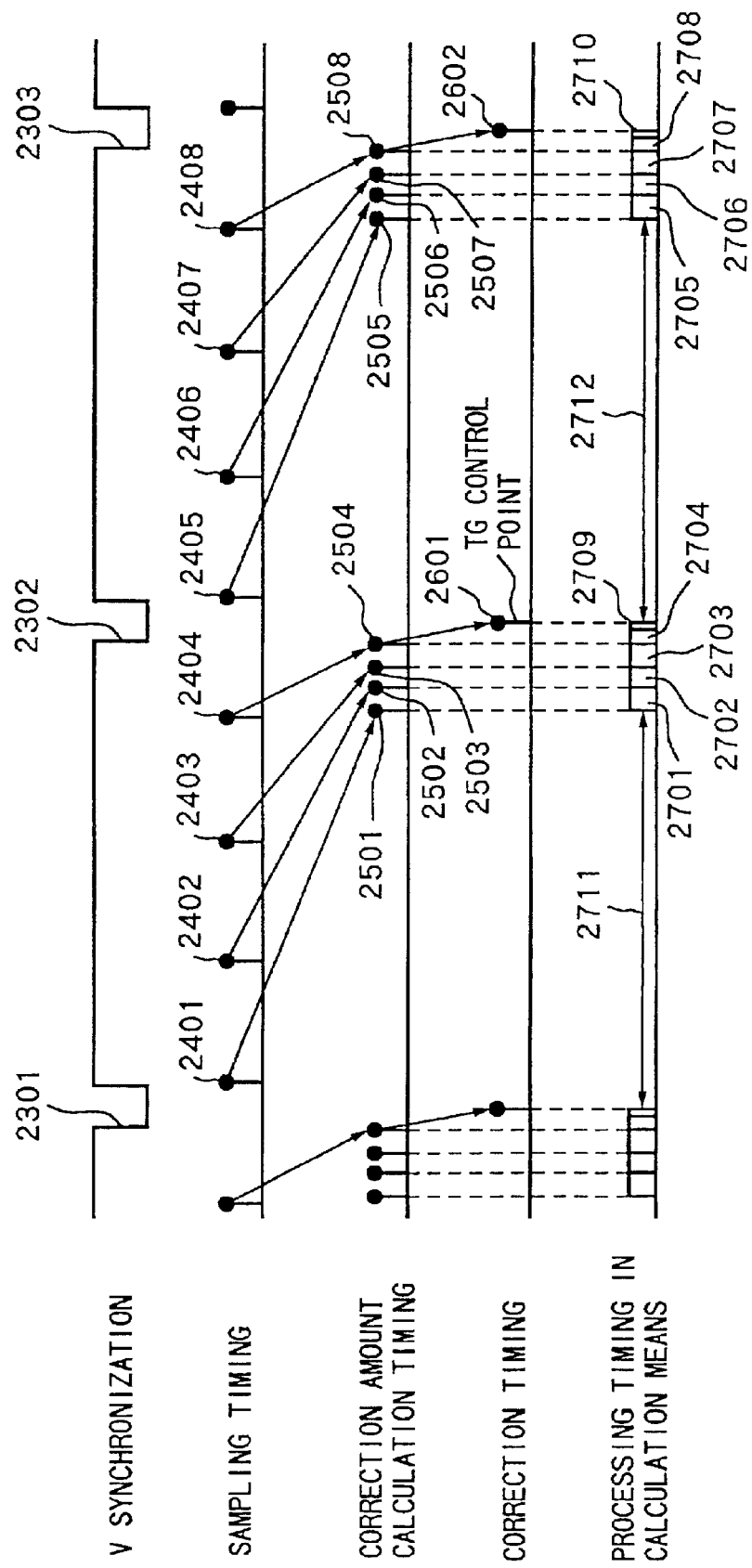
FIG. 19 is a timing chart showing the processing timings of the image sensing apparatus of the fourth embodiment.

The memory 110 is an internal RAM or the like of a microcomputer (not shown) included in the COM, is inserted between the A/D converter 104a and HPF 105, and stores angular velocity data sampled at timings 2401 to 2404 (FIG. 19). The AF control circuit 111 is connected to the signal processor 190 and lens 150, and controls the lens 150 to attain auto focusing while the COM is not calculating.

Figure 18:
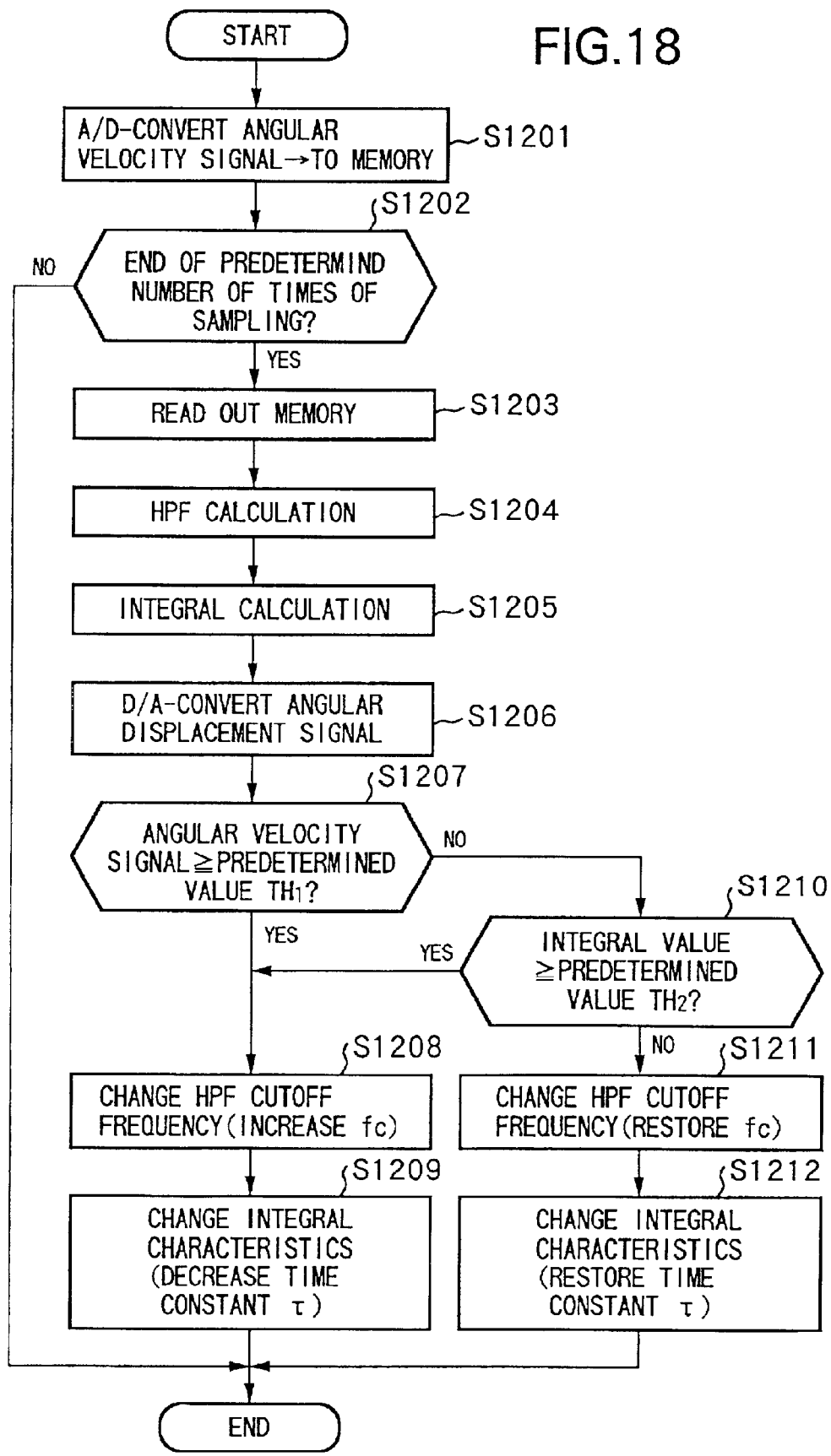
FIG. 18 is a flow chart showing the flow of pan determination in the image sensing apparatus according to the fourth embodiment.

Pan determination in the pan/tilt determination circuit 112 in the image sensing apparatus of the fourth embodiment will be explained below with reference to the flow chart shown in FIG. 18.

Note that the COM repetitively executes this flow at timings corresponding to interrupt periods. When no interrupt request is generated, i.e., when a calculation for anti-shake control need not be made, the COM provides a service for auto-focus control using the AF control circuit 111.

Upon generation of an interrupt request, in step S1201 an angular velocity signal amplified by the amplifier 103 is sampled by the A/D converter 104a and is converted from an analog amount into a digital amount that can be processed inside the COM. This digital data is stored in the memory 110 in the COM. It is checked in step S1202 if sampling has been completed a predetermined number of times. If NO in step S1202, this interrupt processing ends without any processing; otherwise, the flow advances to step S1203.

Since a loop of step S1201→step S1202→step S1201 repeats itself in correspondence with the four sampling timings 2401 to 2404, if it will have been determined as YES in step S1202, four speed data will have been stored in the memory 110.

Step S1203 is executed when an interrupt corresponding to one of timings (correction amount calculation timings) 2501 to 2504 is generated.

In step S1203, shake signal data stored in the memory 110 in step S1201 are read out. In step S1204, the HPF 105 then makes a calculation for data corresponding to the number of samples read out in step S1203 using a cutoff frequency $f_c$ prepared in the previous process. In step S1205, the integrator 106 integrates these data using a time constant $\tau$ prepared in the previous process. In step S1206, the integral (i.e., an angular displacement signal) in step S1205 is converted into an analog amount by a D/A converter 104b, and the converted analog signal is output to the read controller 183.

It is then checked in step S1207 if the angular velocity signal is equal to or higher than a predetermined threshold value $TH_1$. If YES in step S1207, the cutoff frequency $f_c$ of the HPF 105 is set to be higher by a predetermined value than the current value to set the attenuation factor in the low-frequency range to be higher than the current one, in step S1208. In step S1209, the time constant τ used in the integral calculation of the integrator 106 is set to be shorter by a predetermined value than the current value so that the angular displacement output comes close to the reference value, thus ending this processing.

On the other hand, if it is determined in step S1207 that the angular velocity signal is lower than the predetermined threshold value $TH_1$, it is checked in step S1210 if the integral value is equal to or larger than a predetermined threshold value $TH_2$. If YES in step S1210, a panning/tilting state is determined and the flow advances to step S1208; otherwise, a normal control state or a panning/tilting completion state is determined, and the cutoff frequency $f_c$ used in the calculation of the HPF 105 is set to be lower by a predetermined value than the current value in step S1211 to set the attenuation factor in the low-frequency range to be lower than the current one. In step S1212, the time constant value used in the integral calculation of the integrator 106 is set to be longer by a predetermined value than the current value to improve the integral effect, then ending this processing.

As described above, the control sequence shown in FIG. 18 starts in response to various timer interrupts. Hence, while no timer interrupt is generated, the COM provides a service for auto-focus control.

With the above-mentioned control, the COM makes the same calculations as those in the prior art, and can also be used in processing such as auto-focus control.

FIG. 19 is a timing chart showing the processing timings of the image sensing apparatus according to the fourth embodiment. FIG. 19 is a timing chart for explaining the correction amount calculation timings and correction timings in relation to the sampling timings of shake information. Referring to FIG. 19, reference numerals 2301 to 2303 denote vertical synchronization signals; and 2401 to 2408, sampling timings, i.e., conversion timings at which an angular velocity signal obtained by the gyro 101 serving as the angular velocity sensor is converted into a digital amount by the A/D converter 104a. These sampling intervals have an appropriate phase relationship with the vertical synchronization signals 2301 to 2303 and are equal to each other, as shown in FIG. 19. In the fourth embodiment, as in the above embodiments, the number of times of sampling per field between the vertical synchronization periods is four. However, the number of times of sampling is not limited to four, but may be a plurality of number of times.

Angular velocity information sampled by the A/D converter 104a is stored in the memory 110 in the COM as a digital amount once every sampling. When a predetermined number of times of sampling are complete or when a predetermined timing has been reached, conversion from angular velocity information into angular displacement information is made for all the sampled data. As shown in FIG. 19, after sampling at the final sampling timing 2404 in one field is executed, angular velocity data sampled at the sampling timings 2401 to 2404 and stored in the memory 110 undergo calculations during the period between the correction amount calculation timings 2501 and 2504.

Likewise, as for the sampling timings 2405 to 2408 in the next field, after sampling is done at the sampling timing 2408 as the final sampling point, angular velocity data sampled at the sampling timings 2405 to 2408 and stored in the memory 110 undergo calculations during the period between the correction amount calculation timings 2505 and 2508.

Furthermore, the read controller 183 executes read control of the image sensing device using the calculation outputs obtained at the correction amount calculation timings 2504 and 2508 at the end of video periods output from the COM as shake correction target values 2601 and 2602, as in the processing described in the prior art.

Hence, when timings shown in FIG. 19 are set, the period from the time upon determination of the correction timing one field before until the next correction amount calculation timing need only be used for sampling shake information, and the internal processing of the COM can be simplified.

Furthermore, the calculation timings will be explained using FIG. 19. In this case, calculations corresponding to the correction amount calculation timings 2501 to 2508 are done at processing timings 2701 to 2708 in the COM. On the other hand, calculations for determining the extraction position of the image sensing device are done at processing timings 2709 and 2710 in the COM. As can be seen from FIG. 19, except for the time period required for A/D conversion, since the COM uses a continuous time period in one field, non-calculation time periods 2711 and 2712 of the COM can be used for other calculations.

The COM can be used in other purposes, such as auto-focus control, auto exposure control, and the like of the image sensing apparatus. In the above description, the shake correction means executes so-called extraction correction implemented by extracting a portion of a sensed image, but other shake correction means, e.g., an optical correction means, may be used.

<Modification of Fourth Embodiment> . . . Second Modification

A modification of the fourth embodiment (i.e., the second modification) will be described below with the aid of the timing chart shown in FIG. 20. This second modification is characterized in that integral calculations are started at a timing between the final and second final sampling timings, while the fourth embodiment is characterized in that the integral calculations of angular velocity signals start after the final sampling timing of the angular velocity signal.

Note that the basic arrangement of the image sensing apparatus according to the second modification is the same as that shown in FIG. 17 in the aforementioned fourth embodiment, and will be explained using FIG. 17.

Figure 20:
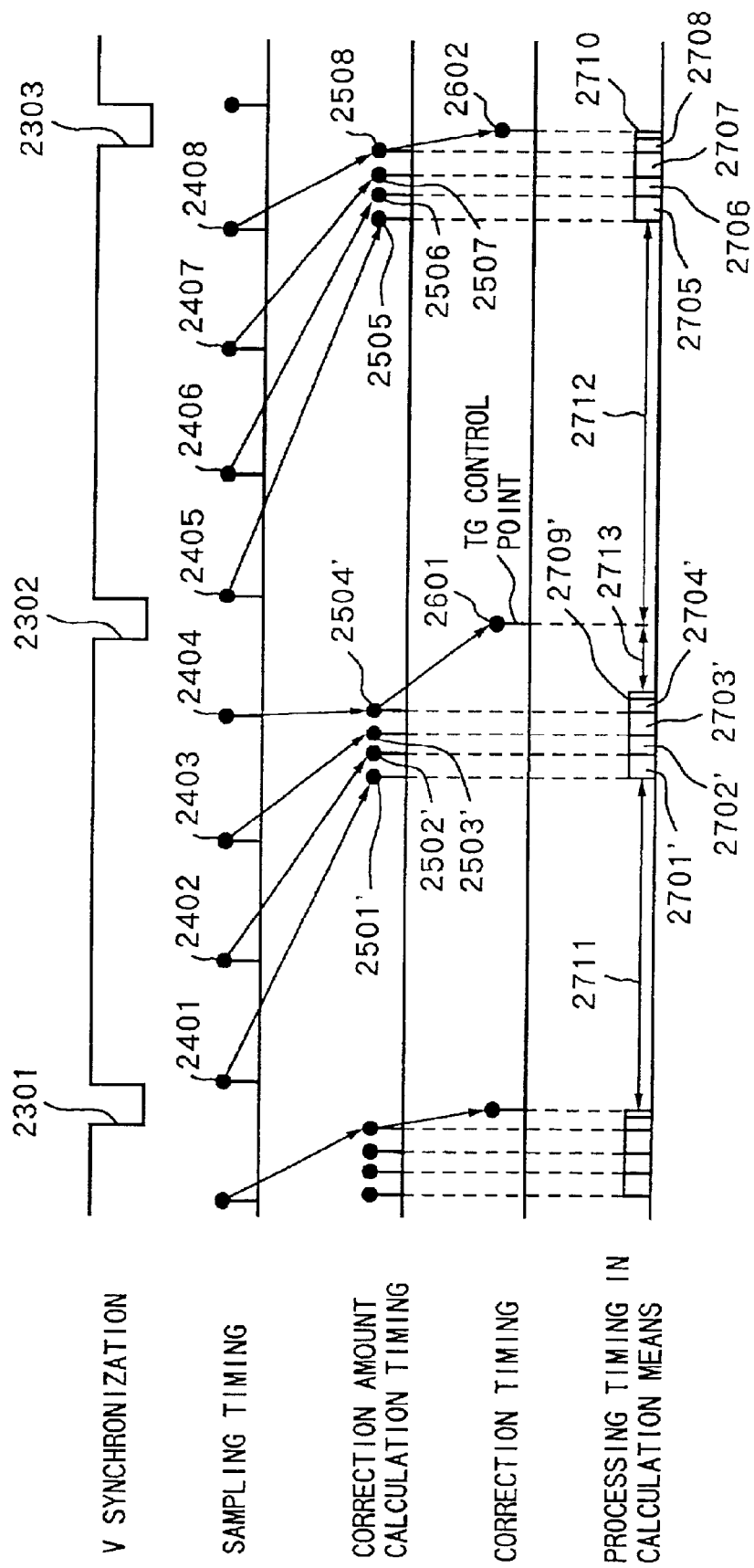
FIG. 20 is a timing chart showing the processing timings of the image sensing apparatus according to a modification (second modification) of the fourth embodiment.

FIG. 20 is a timing chart showing the processing timings of the image sensing apparatus according to the second modification. FIG. 20 is a timing chart for explaining the correction amount calculation timings and correction timings in relation to the sampling timings of shake information.

FIG. 20 is different from FIG. 19 in the calculation timings of the COM.

More specifically, the phases of correction amount calculation timings 2501' to 2504' and processing timings 2701' to 2704' and 2709' in the COM as the calculation start timings corresponding to the angular velocity sampling timings 2401 to 2404 are earlier than those in the timing chart shown in FIG. 19 in the fourth embodiment. These processing timings are set when another calculation is to be additionally executed in the COM (2713).

Such control is done when the drive condition of a focus motor or the read control of the image sensing device is temporarily changed. The processes in the COM are finished at earlier processing timings 2701' to 2704' and 2709', and another processing may be inserted in this idle time period.

The calculation timings of the second modification can be set after the sampling timing 2404 as the final sampling point in one field, and before the correction calculation timing 2504', thus posing no problem.

Since the processing time period required for calculations is known in advance, whether or not another processing can be executed after the sampling timing 2404 and before the correction amount calculation timing 2501' can be easily determined.

Furthermore, in the second modification, shake signals sampled at the sampling timings within one field undergo calculations to obtain correction data. However, these sampling timings need not fall within a single field. For example, correction data corresponding to the correction timing 2601 may be calculated using data sampled at the sampling timings 2403 to 2406, and the next correction data can be calculated using four sampling data after the sampling timing 2407.

<Effect of Fourth Embodiment and the Like>

As mentioned above in detail, according to the image sensing method and apparatus of the fourth embodiment and second modification, since the computation means such as a microcomputer or the like can be used in continuous processing other than shake correction control, it can be efficiently used in other purposes while executing shake correction control.

According to the second modification, the degree of freedom in the design of integration start points can be improved.

<Fifth Embodiment>

The fifth embodiment of the present invention will be explained with reference to FIG. 21 and the subsequent figures. The fifth embodiment is an improvement of the image sensing apparatus of the first embodiment, and accurately synchronizes the sampling timing of an angular velocity signal with the center time of an actual storage time period.

Figure 21:
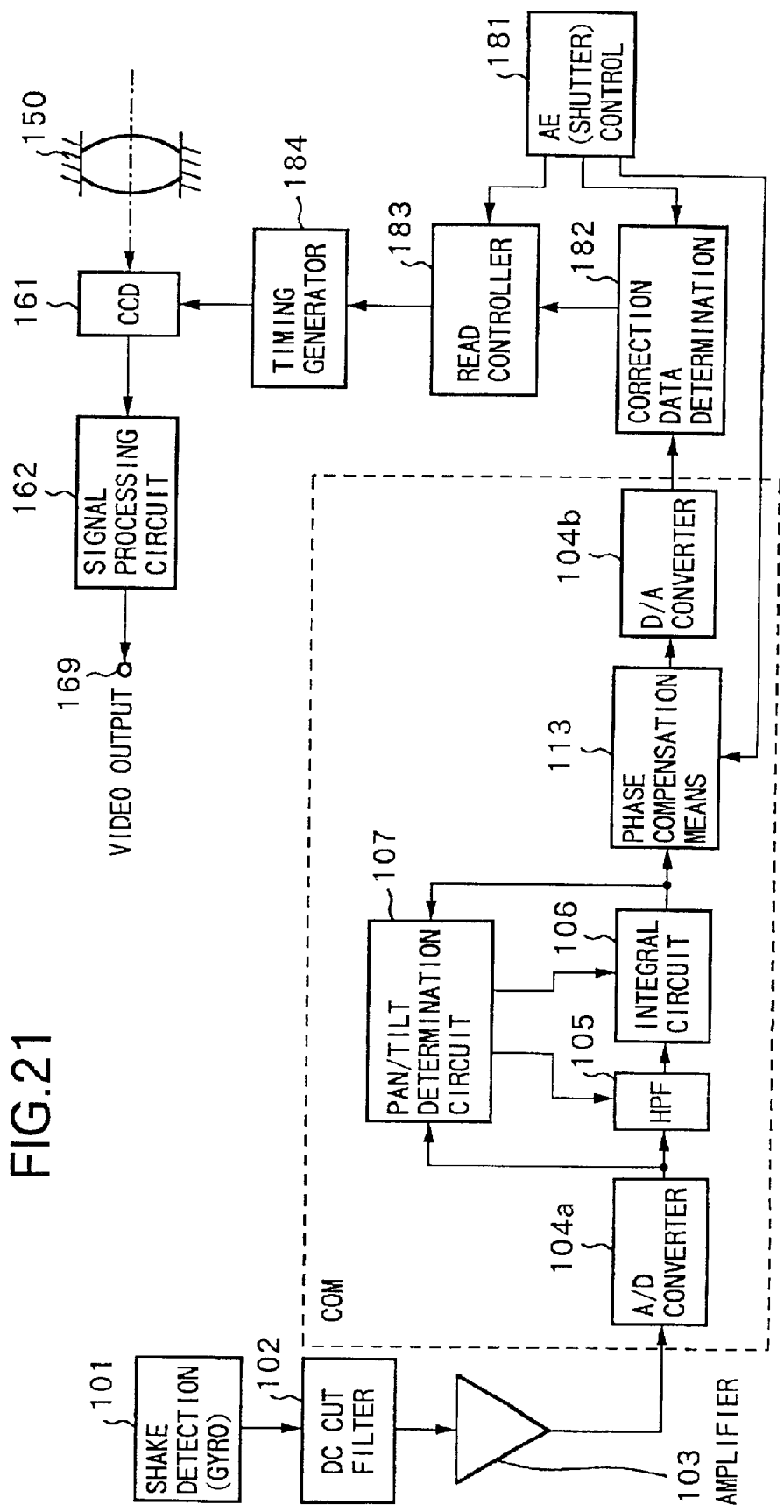
FIG. 21 is a block diagram showing the arrangement of an image sensing apparatus according to the fifth embodiment of the present invention.

FIG. 21 is a block diagram showing the arrangement of the image sensing apparatus according to the fifth embodiment. The same reference numerals in FIG. 21 denote the same parts as those in the apparatuses in the above embodiments, and a detailed description thereof will be omitted.

The apparatus shown in FIG. 21 is different from that shown in FIG. 8 (first embodiment) in that a phase compensation circuit 113 is added.

The phase compensation circuit 113 is inserted between the integral circuit 106 and D/A converter 104b. The phase compensation circuit 113 is also connected to the electronic shutter 181 serving as an AE control means.

In the first embodiment, the A/D converter 104a samples an angular velocity signal once per field, and the correction amount is calculated once per field, accordingly. However, in the fifth embodiment, an angular velocity signal is sampled and a shake correction target value is calculated each a plurality of number of times during one field period, as in the third and fourth embodiments and the like.

The operation of the correction data determination unit 182 will be explained below with reference to the timing chart shown in FIG. 22.

Figure 22:
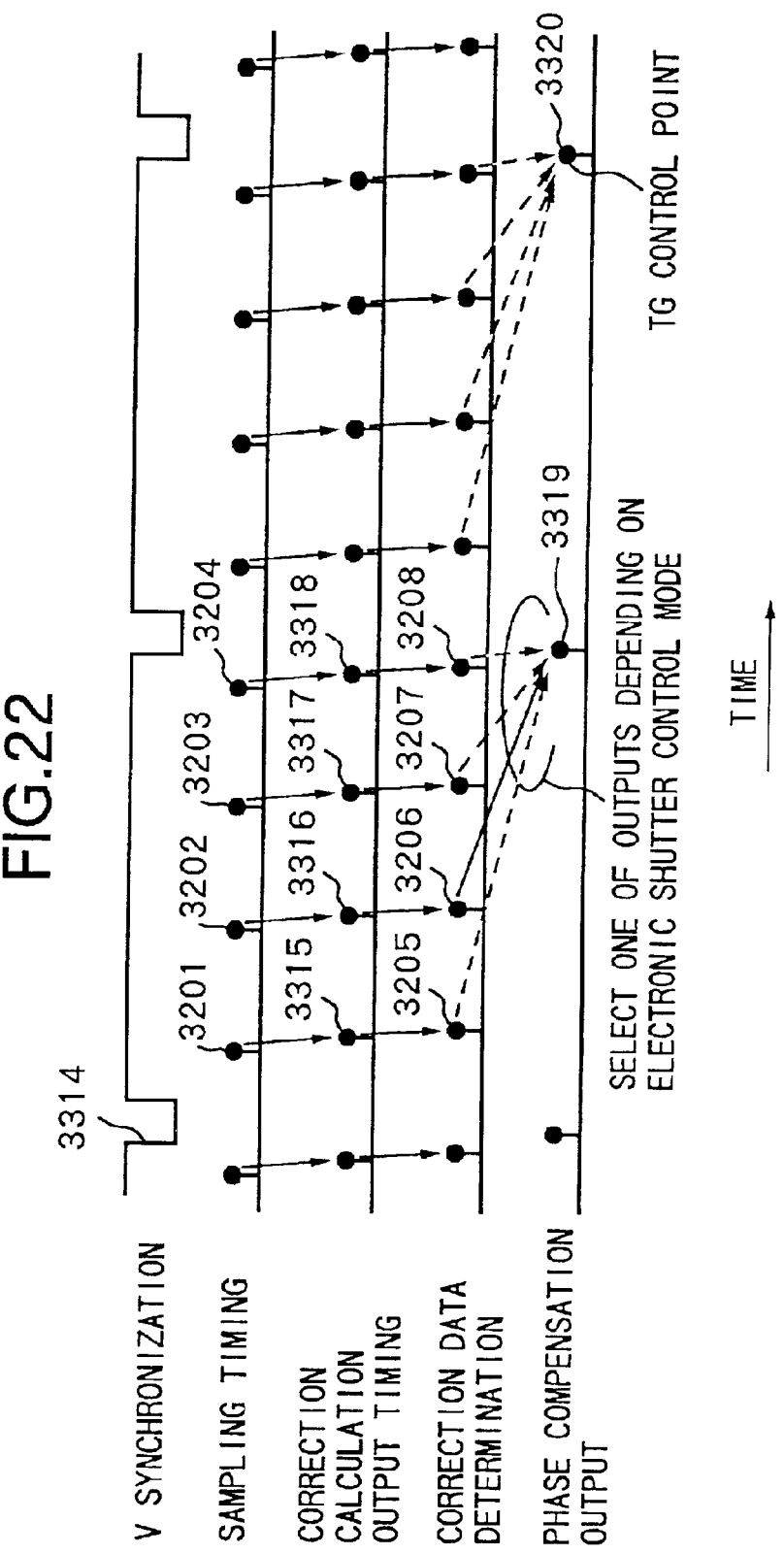
FIG. 22 is a timing chart for explaining the operation of a correction data determination means of the image sensing apparatus in the fifth embodiment.

Referring to FIG. 22, reference numeral 3314 denotes a vertical synchronization signal. Reference numerals 3201 to 3204 denote conversion timings (=sampling timings) at which an angular velocity signal obtained by the gyro sensor (angular velocity sensor) 101 is converted into a digital amount by the A/D converter 104a. In the fifth embodiment, sampling is made four times at equal timing intervals during one field period for the sake of simplicity. However, the number of times of sampling need only be a plurality of times, and the intervals need not be equal to each other as long as the sampling timings have an appropriate phase relationship with the synchronization signal 3314.

Angular velocity information sampled by the A/D converter 104a undergoes conversion from angular velocity information into angular displacement information in the COM and also undergoes panning control upon each sampling. Calculations in the COM are also made at timings synchronized with the aforementioned A/D conversion timings, and correction calculation outputs as correction target values used in shake correction are obtained at timings 3315 to 3318 shown in FIG. 22.

In FIG. 22, the output 3315 from the integrator 106 reflects angular velocity data sampled at the timing 3201, and the calculation output 3316 reflects angular velocity data sampled at the timing 3202. In this fashion, in the fifth embodiment, every time one angular velocity data is sampled (3201 to 3204), a shake correction target calculation output which reflects that sampled data is obtained at a corresponding one of the timings 3315 to 3318.

The phase compensation circuit 113 varies the signal phase of the output from the integrator 106 by a predetermined amount. The compensated signals are obtained at timings 3205 to 3208.

The phase compensation by the phase compensation circuit 113 may be implemented by a combination of phase advance and delay filters and the like or by software in the COM so as to control the phase advance or delay amount. In practice, the circuit 113 has a filter arrangement as a combination of a low-pass filter, high-pass filter, and the like. The phase compensation circuit 113 may use a delay means such as a shift register or the like.

The phase advance or delay amount set by the phase compensation circuit 113 is varied on the basis of the control mode of the electronic shutter 181 serving as an AE control means.

In this way, four angular velocity signals sampled by the A/D converter 104a are output from the COM as four phase-compensated correction target values.

The correction data determination unit 182 will be explained below.

The correction data determination unit 182 selects an optimal point as an extraction target value from the phase-compensated calculation outputs 3205 to 3208 output from the COM. This selection condition depends on the control mode of the electronic shutter 181. More specifically, the calculation output timing to be selected is determined in correspondence with the ratio between the actual storage time period the control mode sets in the image sensing device 161, and a normal storage time period in that image sensing device. For example, in FIG. 22, the calculation result 3206 is selected as correction data 3319. The selected correction data is used by the read controller 183 in image area extraction control for the subsequent field.

Figure 23:
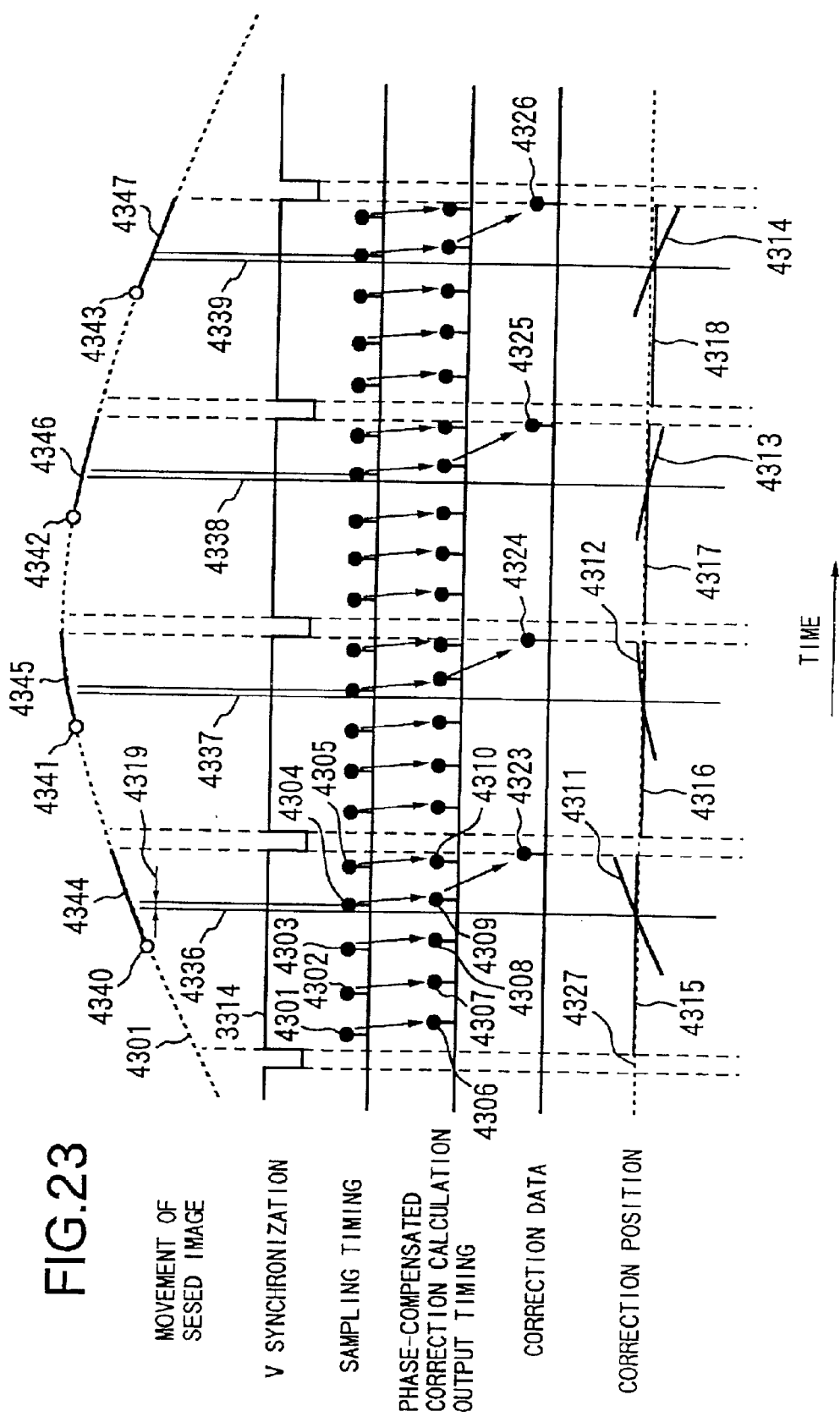
FIG. 23 is a timing chart for explaining operations from storage of an image sensing device to correction upon operation of an electronic shutter in the image sensing apparatus of the fifth embodiment.

The relationship among the shake correction target value calculation output timings, phase compensation amounts, and the storage time period of the image sensing device 161, i.e., the electronic shutter speed will be explained below using FIG. 23. The timing chart in FIG. 23 is different from that in FIG. 10 (first embodiment) in that the sampling timing of angular velocity data used in extraction by the A/D converter 104a is set at a timing in the neighborhood of the central time of a storage time period of the image sensing device 161, and any error between the set sampling timing and the central time of the actual storage time period is corrected by the phase compensation circuit 113.

This feature will be explained below with reference to FIG. 23.

Reference numerals 4301 to 4305 denote sampling timings within one field. Furthermore, calculation results obtained by calculating correction target values based on sampled shake information (angular velocity information) and phase-compensating these values by the aforementioned calculations are output at timings 4306 to 4310.

If the central time of an actual storage time period 4344 is indicated by 4336, the fifth embodiment selects shake data sampled at the sampling point 4304 close to this timing 4336. The phase compensation circuit 113 makes a phase compensation calculation to correct a sampling delay amount 4319 as a time delay between the central time 4336 of the actual storage time period 4344 and the sampling timing 4304 to obtain phase-compensated correction calculation outputs 4306 to 4310. Of these outputs, angular velocity data sampled at the sampling timing 4304 undergoes integration by the integrator 106, and this integral output undergoes a phase compensation calculation, thus selecting a phase-compensated correction calculation output 4309 as correction data.

Hence, any time difference between the sampling point 4304 of a shake signal and the central time 4336 of the actual storage time period 4344 is compensated for by the phase compensation circuit 113, so that the central time of the actual storage time period 4344 of the image sensing device 161 can be set at a correction reference position 4327.

Compared to the displacement barycentric positions 1781 to 1784 of the first embodiment described previously with reference to FIG. 10, displacement barycentric positions 4315 to 4318 of the fifth embodiment are closer to the correction reference position 4327 (or 1327).

Therefore, since the correction data determination unit 182 selects data at nearly the central time of the actual storage time period of the image sensing device 161, and the phase compensation circuit 131 corrects any time error between the sampling timing and the central time of the actual storage time period of the image sensing device 161, high anti-shake performance can be obtained.

In this embodiment, since the calculation result of the correction target value selected and determined by the correction data determination unit 182, and the phase advance/delay compensation amounts by the phase compensation circuit 113 depend on the shutter speed selected by the electronic shutter 181, unique selection data corresponding to the shutter speed can be prepared.

The same applies when a change in the synchronization interval of the image sensing apparatus itself is used as a control input instead of the electronic shutter operation.

<Sixth Embodiment>

The sixth embodiment is directed to an image sensing apparatus having the features of both the third and fifth embodiments. More specifically, the sixth embodiment can simultaneously compensate for a response delay of the angular velocity sensor 101 (function of third embodiment), and accurately synchronize the sampling timing of the angular velocity data with the central time of the storage time period (function of the fifth embodiment).

Figure 24:
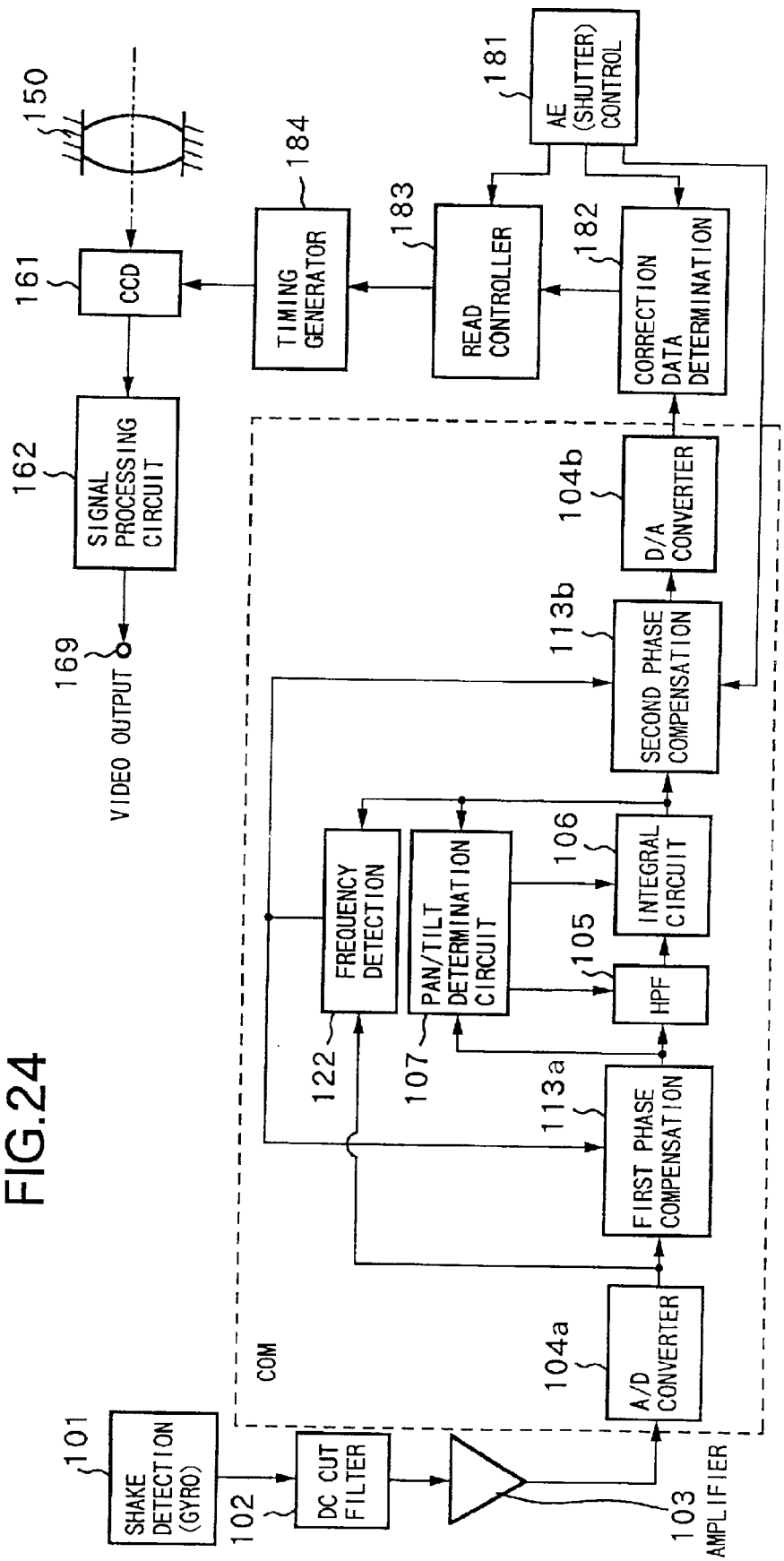
FIG. 24 is a block diagram showing the arrangement of an image sensing apparatus according to the sixth embodiment of the present invention.

FIG. 24 is a block diagram showing the basic arrangement of an image sensing apparatus according to the sixth embodiment.

The same reference numerals in FIG. 24 denote the same parts as those in the aforementioned embodiments, and a detailed description thereof will be omitted.

The sixth embodiment has a second phase compensation circuit 113b that has a function equivalent to the phase compensation circuit 113 in the fifth embodiment, and also has a first phase compensation circuit 113a for performing phase compensation of the sensor 101 in correspondence with the frequency and a frequency detector 122, in addition to the arrangement of the fifth embodiment.

The first phase compensation circuit 113a and frequency detector 122 of the sixth embodiment have the same arrangements as the sampling timing controller 121 and frequency detector 122 of the third embodiment.

The first phase compensation circuit 113a is inserted between the A/D converter 104a and HPF 105, and the second phase compensation circuit 113b is inserted between the integral circuit 106 and D/A converter 104b. The frequency detector 122 is connected to the A/D converter 104a, and detects a frequency component in angular velocity data sampled by the A/D converter 104a, and that in displacement data integrated by the integral circuit 106. The detection results of the frequency detector 122 are supplied to the first and second phase compensation circuits 113a and 113b. The pan/tilt determination circuit 107 is respectively connected to a connection line between the first phase compensation circuit 113a and HPF 105, and that between the second phase compensation circuit 113b and integral circuit 106.

The first phase compensation circuit 113a for performing phase compensation of the angular velocity sensor, and the frequency detector 122 are provided to eliminate influences arising from correction errors in shake correction due to response characteristics errors of the angular velocity sensor 101 with respect to the shake frequency. More specifically, the response characteristics of the angular velocity sensor 101 such as a gyro sensor worsen as the frequency becomes higher (as has already been described previously with reference to FIG. 7).

The operations of the first phase compensation circuit 113a and frequency detector 122 will be explained below.

As in the third embodiment, the frequency detector 122 makes a computation such as FFT, and uses a peak frequency or information obtained by averaging a plurality of frequency components having power levels equal to or higher than a predetermined level as a shake frequency. Also, as a simple detection method, the count value of sign changed in signals per unit time period may be used as frequency information.

The reason why the frequency detector 122 receives two data, i.e., shake information sampled by the A/D converter 104a and a target vale signal integrated by the integral circuit 106, is the same as that in the third embodiment described above. That is, the angular velocity sensor 101 has given detection characteristics: the output level is large for a high frequency but is small for a low frequency while the amplitude remains the same. Thus, the signal level is apparently amplified by integration so as to precisely detect a low frequency.

Shake frequency information detected by the frequency detector 122 undergoes phase advance compensation for a predetermined phase delay corresponding to the frequency detected by the first phase compensation circuit 113a. More specifically, the phase is advanced by an amount that compensates the response characteristics shown in FIG. 7 in correspondence with the frequency detected by the frequency detector 122. For example, since there is a response delay of 10 deg at 10 Hz, when the frequency detector 122 detects 10 Hz, the first phase compensation circuit 113a makes control for advancing phase by 10 deg.

As for the arrangement of the first phase compensation circuit 113a, the circuit must vary its characteristics by determining the frequency to be corrected on the basis of the detected frequency using an arrangement such as a high-pass filter, and need only comprise an HPF or the like of a second phase compensation circuit 113b (to be described later).

The operation of the second phase compensation circuit 113b will be explained below.

The second phase compensation circuit 113b of the sixth embodiment implements control of the phase advance/delay amount as in the phase compensation circuit 113 in the fifth embodiment. To achieve such operation, a combination of a low-pass filter (LPF) and high-pass filter (HPF), the time constant of which is variable, may be used. Such filter depends on the passband of phase advance or delay characteristics. Hence, in this embodiment, in order to eliminate such frequency response, the phase advance/delay control of the second frequency compensation circuit 113b is done on the basis of two parameters, i.e., the control mode of the electronic shutter 181 and the frequency detected by the frequency detector 122.

FIGS. 25A and 25B show examples of the filter characteristics. The phase advance/delay control with respect to the frequency will be explained below with reference to FIGS. 25A and 25B.

The characteristics shown in FIG. 25A are typical ones of a 1st-order LPF (low-pass filter). Referring to FIG. 25A, reference numeral 601 denotes gain characteristics with respect to the frequency; and 602, a change in phase under the same condition. When the time constant of the LPF with such characteristics is changed, the gain and phase characteristics change and shift to the right and left on the graph shown in FIG. 25A. Since the phase characteristics are in question, changes in phase characteristics will be explained below. Upon changing the time constant, the phase characteristics change from a curve 603 to curve 604. Furthermore, when the characteristics are used as phase delay compensation characteristics, a portion with a small change in gain of the characteristics is used, and the phase delay amount can be varied without largely changing the gain.

Hence, when an LPF is used in the second phase compensation circuit 113b, the time constant is uniquely determined by the frequency band, the phase of which is to be delayed, and its delay amount.

Phase advance compensation will be described below using typical characteristics of a 1st-order HPF shown in FIG. 25B. Referring to FIG. 25B, reference numeral 605 denotes gain characteristics with respect to the frequency; and 606, changes in phase under the same condition.

When the time constant of the HPF with such characteristics is changed, the gain and phase characteristics change and shift. Since the phase characteristics are in question as in the LPF described above, a change in phase characteristics will be explained below. Upon changing the time constant, the phase characteristics change from a curve 607 to curve 608. Furthermore, when the characteristics are used as phase advance compensation characteristics, a portion with a small change in gain of the characteristics is used, and the phase can be advanced without largely changing the gain. Hence, when the HPF is used in the second phase compensation circuit 113b, the time constant is uniquely determined by the frequency band, the phase of which is to be advanced, and its advance amount.

Note that a control system which simultaneously performs phase advance and delay compensation comprises both the LPF and HPF, and their time constants are set in correspondence with the pertinent condition, thus allowing phase advance and delay compensation processes.

However, as can be seen from the above characteristics, upon executing phase advance/delay compensation, the frequency is an important parameter. Upon executing phase advance/delay compensation, if the frequency varies, the advance or delay time also varies, and appropriate correction cannot be made. Hence, it is important to correct such phase advance/delay compensation on the basis of the detected frequency.

In the sixth embodiment, the phase compensation frequency is determined based on information of the frequency detector 122 in addition to the advance/delay compensation in the fifth embodiment so as to optimally adjust that frequency.

Upon executing this operation, a table that stores a correspondence between, e.g., the control mode of the electronic shutter 181 and frequency information of the frequency detector 122 that detects the current shake frequency is prepared in advance, and the phase compensation frequency is uniquely determined on the basis of the correction data timing determined by the correction data determination unit 182 based on the current AE control mode, and the shake frequency.

FIG. 26 shows an example of this table. The table shown in FIG. 26 describes sampling point data and phase compensation data using the shake frequency and AE control mode as arguments. The upper row of the table shows typical points of typical shake frequencies [Hz], and the left column shows typical values of shutter speeds [s] as the AE operation modes. Note that sampling is done 10 times at equal intervals during one field, and phase compensation can be done in 0.1 increments by dividing one sampling interval into 10 intervals.

In FIG. 26, for example, "9/–2.2" means that the ninth sampling point is selected, and phase compensation shifts by 2.2/10 deg toward the advance side. Also, as a table data value with – sign becomes larger, the cutoff frequency of the HPF lowers; as a table data value with + sign becomes larger, the cutoff frequency of the LPF lowers. Furthermore, sampling is done 10 times at equal intervals during one field. A value indicating a phase advance/delay indicates a shift amount in intervals obtained by equally dividing one sampling interval into 10 intervals.

For example, when 1/1000 [s] is selected as the AE operation mode (shutter speed), and the peak frequency=1 [Hz] of the current shake frequency is detected, the ninth sampling points of 10 sampling points in one frame is selected by the correction data determination unit 182 as data that determines the correction target value, and phase compensation for advancing phase by a ratio of 2.2/10 in the time axis direction can be done by the second phase compensation circuit 113b.

Therefore, since the correction data determination unit 182 selects nearly the central time of the actual storage time period of the image sensing device 161 as a sampling timing of data to be selected without fixing the sampling timing at nearly the central time of a synchronization period unlike in the prior art, and any time error between that sampling timing and the central time of the actual storage time period of the image sensing device 161 is corrected by the second phase compensation circuit 113b in consideration of shake frequency information, high anti-shake performance can be assured.

<Modification of Sixth Embodiment> . . . Third Modification

Figure 27:
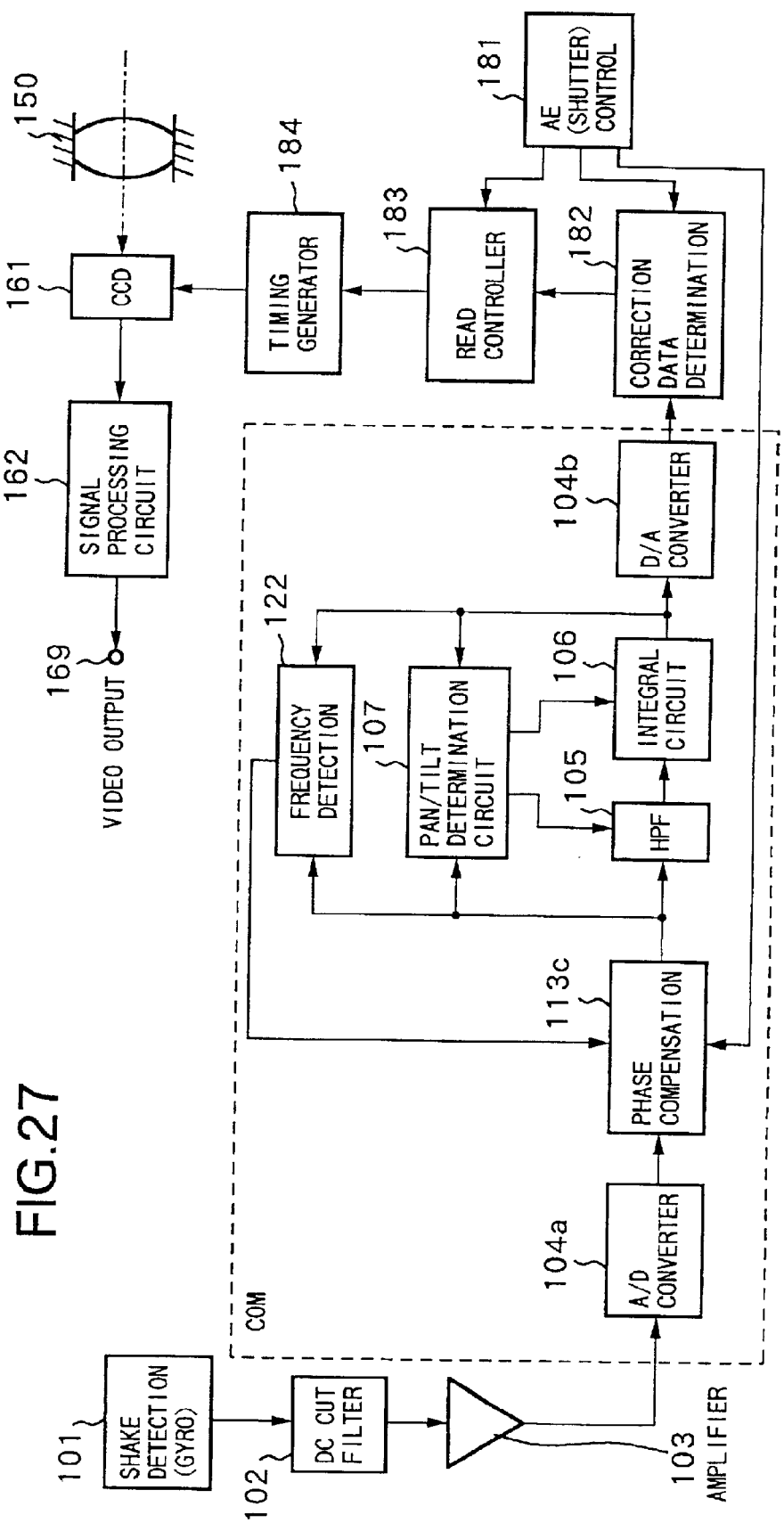
FIG. 27 is a block diagram showing the arrangement of an image sensing apparatus according to a modification (third modification) of the sixth embodiment.

A modification of the sixth embodiment (third modification) will be explained below with reference to FIG. 27.

The third modification is characterized in that the first and second phase compensation circuits 113a and 113b of the sixth embodiment are combined into a single phase compensation circuit 113c.

The phase compensation circuit 113c is inserted between the A/D converter 104a and HPF 105. The phase compensation circuit 113c is connected to the frequency detector 112 and electronic shutter 181.

As can be understood from the description of the sixth embodiment, the first phase compensation circuit 113a shown in FIG. 24 serves as a phase advance compensation means using the HPF, and controls its advance amount on the basis of shake frequency information of the frequency detector 122. Also, the second phase compensation circuit 113b shown in FIG. 24 serves as a phase delay/advance compensation means as a combination of an HPF and LPF, and controls the phase compensation amount uniquely determined based on the shake frequency information obtained by the frequency detector 122 and the operation mode of the electronic shutter 181.

In the third modification, since these circuits compensate phases commonly based on the shake information output from the frequency detector 122, they are combined to simplify the arrangement. As for phase correction amounts, compensation values that consider the response characteristics of the angular velocity sensor 101 are superposed on the "sample point—phase compensation amount table" described in the sixth embodiment using FIG. 26, thus achieving a common phase compensation means.

The position of the phase compensation circuit 113c is not particularly limited as long as it is inserted between the angular velocity sensor 101 and read controller 183 as in the third modification.

<Effect of Fifth and Sixth Embodiments>

As described in detail above, according to the image sensing method and apparatus of the fifth and sixth embodiments (also the third modification), since the phase of a shake signal or shake correction signal is corrected on the basis of the drive condition of the image sensing device (=timing selected by the correction data determination means), even when storage & read control of the image sensing device is done by electronic shutter operation, a sufficiently high anti-shake effect can be assured independently of the shake frequency.

As many apparently widely different embodiments of the present invention can be made without departing from the spirit and scope thereof, it is to be understood that the invention is not limited to the specific embodiments thereof except as defined in the appended claims.

What is claimed is:

1. An image sensing apparatus for electronically applying shake correction to sensed image data by changing a read position of the sensed image data at said image sensing apparatus, and outputting corrected image data, comprising:

shake detection means for detecting a shake;

sampling means capable of sampling shake information detected by said shake detection means at a plurality of sampling timings within one field period of said image sensing apparatus, wherein the one field period defines an accumulation time period of said image sensing apparatus;

selection means for selecting a shake information signal at one of the plurality of sampling timings, which corresponds to a drive condition of image sensing means at the time of image sensing;

correction data calculation means for calculating a shake correction data used in the shake correction by a predetermined calculation of the shake information signal selected by said selection means; and correction means for applying the shake correction to the sensed image data in accordance with the obtained shake correction data, wherein an operation phase of said sampling means is variable within a sampling interval.

2. The apparatus according to claim 1, wherein said sampling means varies the sampling timing in accordance with the drive condition of the image sensing means.

3. The apparatus according to claim 2, wherein said correction means sets an image data extraction position of a temporary storage memory in the image sensing device that stores an image signal in correspondence with the shake correction data calculated by said correction data calculation means, and outputs image data read out from the extraction position as shake-corrected sensed image data.

4. The apparatus according to claim 1, wherein said sampling means comprises:

an A/D converter for A/D-converting an output from said shake detection means at the plurality of sampling timings within one field; and an integral circuit for integrating a series of shake information signals detected at the plurality of sampling timings by said A/D converter in units of fields; and said selection means selects an integrated signal, from a series of integrated signals output from said integral circuit, in correspondence with the drive condition of said image sensing apparatus.

* * * * *

UNITED STATES PATENT AND TRADEMARK OFFICE
CERTIFICATE OF CORRECTION

PATENT NO. : 6,982,746 B1 Page 1 of 1
DATED : January 3, 2006
INVENTOR(S) : Hideo Kawahara It is certified that error appears in the above-identified patent and that said Letters Patent is hereby corrected as shown below:

<u>Column 16,</u>
Line 39, delete "CON", and replace it with -- COM --.

Signed and Sealed this

Fourth Day of April, 2006

JON W. DUDAS
*Director of the United States Patent and Trademark Office*